United States Patent [19]

Nakajima

[11] Patent Number: 5,717,613
[45] Date of Patent: Feb. 10, 1998

[54] METHOD OF DETERMINING A PITCH ARRANGEMENT OF A TIRE

[75] Inventor: Yukio Nakajima, Tokyo, Japan

[73] Assignee: Bridgestone Corporation, Tokyo, Japan

[21] Appl. No.: 767,848

[22] Filed: Dec. 17, 1996

Related U.S. Application Data

[63] Continuation of Ser. No. 258,567, Jun. 10, 1994, Pat. No. 5,617,341.

[30] Foreign Application Priority Data

Jun. 10, 1993 [JP] Japan ................................. 5-138786
Mar. 25, 1994 [JP] Japan ................................. 6-55622

[51] Int. Cl.⁶ ........................... B60C 11/11; B60C 11/03; B60C 11/00
[52] U.S. Cl. .............. 364/578; 152/209 D; 152/209 R; 364/551.01
[58] Field of Search ................ 364/550, 551.01, 364/574, 578; 152/209 R, 209 D; 73/146

[56] References Cited

U.S. PATENT DOCUMENTS

| | | | |
|---|---|---|---|
| 4,327,792 | 5/1982 | Landers | 152/209 R |
| 4,474,223 | 10/1984 | Landers | 152/209 R |
| 4,598,747 | 7/1986 | Flechtner | 152/209 R |
| 4,598,748 | 7/1986 | Campos et al. | 152/209 R |
| 4,727,501 | 2/1988 | Parker et al. | 364/574 |
| 5,295,087 | 3/1994 | Yoshida et al. | 364/578 |
| 5,371,685 | 12/1994 | Bandel et al. | 364/505 |

FOREIGN PATENT DOCUMENTS

| | | |
|---|---|---|
| 0118059 | 9/1984 | European Pat. Off. . |
| 0125437 | 11/1984 | European Pat. Off. . |
| 0438108 | 7/1991 | European Pat. Off. . |
| 0464438 | 1/1992 | European Pat. Off. . |
| 4232105 | 8/1992 | Japan . |

OTHER PUBLICATIONS

Cover pages and index of book by Hiroaki Kitano entitled "Genetic Algorithms", published Jun. 3, 1993, with partial English translations of Chapters 1,2 and 3.

*Primary Examiner*—Emanuel T. Voeltz
*Assistant Examiner*—Edward J. Pipala
*Attorney, Agent, or Firm*—Sughrue, Mion, Zinn, Macpeak & Seas, PLLC

[57] ABSTRACT

A method of determining a pitch arrangement of a tire, to design and develop a tire efficiently. An initial value of the pitch arrangement is determined corresponding to a set value. A model of a noise pulse generated in each pitch of the tire, the objective function representing a physical amount for evaluating noise performance of the tire, a design variable for determining the pitch arrangement, and a constraint for constraining the pitch arrangement are determined for the initial value, and the pitch arrangement whose objective function converges and is minimized is determined while satisfying a constraint by varying a design variable. A pitch ratio whose value of the objective function is minimized is determined by fluctuating of the pitch ratio while the first and the last pitch ratio are fixed among determined pitch arrangements. The pitch arrangement and the pitch ratio whose value of the objective functions are minimized are selected among the pitch arrangements for a hundred initial values.

16 Claims, 17 Drawing Sheets

METHOD OF DETERMINING A PITCH ARRANGEMENT OF A TIRE

This is a Continuation of application Ser. No. 08/258,567 filed Jun. 10,1994 now U.S. Pat. No. 5,617,341.

BACKGROUND OF THE INVENTION

1. Field of the Invention

The present invention relates to a method of determining a pitch arrangement of a tire. More particularly it relates to a method which makes it possible to efficiently and easily determine the pitch arrangement for attaining an improved noise performance of a tire, as well as to determine the best pitch arrangement of the tire at economic cost.

2. Description of the Prior Art

Design work of a vehicle tire running safely and quietly at a high speed on a dry, wet and an ice and snow road has been well understood, and the consideration of a tire which runs quietly has been done theoretically. Grooves arranged on a tread of the tire are designed based on a repeated design cycle of a plurality of variable pitches according to a formula calculated mathematically.

Land portions (called design elements hereinafter) are divided by lateral grooves and circumferential grooves, which form the pitch and the pitch arrangement on the tire surface, and are arranged by a manual operation or a tire mold based on a design value. The term pitch means a relative length of the design element, and the pitch arrangement means an order of the pitch arranged on the tire surface.

As described in Japanese Patent Laid-Open 4-232105, though pitches can be different lengths, less than approximately 9 kinds or less are used in practice. A specific pitch length of a certain pitch arrangement can be varied based on the circumferential length of the tire. As a result, when a second tire runs at a lower speed than a first tire, the specific pitch arrangement of the pitch having a relative length of the first tire whose diameter is greater than that of the second tire generates the same acoustic fingerprint as that of the second tire. (It can be simulated by a String Plot which shows characteristics. The String Plot plots amplitude<ordinate> against harmonic number<abscissa> which shows the number of the times of vibration during one round when the tire runs with noise.)

A method of design of the specific tread is described by Landers in U.S. Pat. No. 4,327,792 and U.S. Pat. No. 4,474,223. Another approach to optimize the design of the tread is described by Flechtner in U.S. Pat. No. 4598747. In this way, slits are formed on each projection, and a wave length and an amplitude of the slits to a dimension of the slits are decreased as much as possible while satisfying other standards. Further, Compos et al describe a mathematical method of the design in U.S. Pat. No. 4,598,748.

In order to determine whether or not the above mentioned approaches to the design of the quiet tire succeed, a test must be done for the tire, and the tire furnished with enough dimension to be tested must be physically manufactured. In general, the test of the tire for "noise level and quality" is done by adopting four (or less) experimental tires to wheel rims of a car driven by a person having sensitive ears.

The best way to test a noise characteristic of the tread design conveniently with high reliability is to simulate the tread noise of the tire running on a road surface by a computer, as described in detail by Parker et al in U.S. Pat. No. 4,727,501. Japanese Patent Laid-Open 4-232105, teaches a way to determine a ratio of the pitch length (pitch ratio) to be white noise based on a prime number.

In any of the above mentioned ways, however, because a combination of the pitch arrangement which provides the quiet tire and the best pitch ratio might be missed, only a limited number of the pitch ratios and the pitch arrangement can be designed and tested.

It is an object of the present invention to provide a method of determining a pitch arrangement which decreases the possibility of avoiding the combination of the best pitch as far as possible.

SUMMARY OF THE INVENTION

The present invention provides a method of determining a pitch arrangement of a tire which selects the pitch arrangement having an optimal optimum value of an objective function among a plurality of the pitch arrangements after determining the plurality of the pitch arrangements corresponding to a plurality of initial arrangements by repeating, in each of predetermined initial arrangements, the steps of:

(a) determining a model of a noise pulse generated in each pitch of the tire, the objective function representing a physical amount for evaluating noise performance of the tire, a design variable for determining the pitch arrangement, and a constraint for constraining the pitch arrangement;

(b) determining a value of the design variable which gives the optimum value of the objective function while satisfying the constraint; and (c) designing the pitch arrangement on the basis of the design variable which gives the optimum value of the objective function.

After many studies, the inventor paid attention to "Genetic algorithms", which are used in a different field, and applied the teaching thereof to the tire field and established a method of designing a tire.

More concretely, in a preferred method of determining a pitch arrangement of a tire in accordance with the present invention, step (a) comprises: determining a group subject to selection, consisting of a plurality of pitch arrangements; and determining, with respect to the pitch arrangements of the group subject to the selection, the objective function representing the physical amount for evaluating tire performance, the design variable for determining the pitch arrangements, the constraint for constraining at least one of adjacent pitch length ratios, a maximum pitch length ratio and a minimum pitch length ratio, the numbers of pitches belonging to each pitch length, the number of the pitches having the same pitch length arranged in a row, and the physical amount for evaluating performance, and a fitness function which can be evaluated from the objective function and the constraint; and step (b) comprises: selecting two pitch arrangements from the group subject to selection on the basis of the fitness function; effecting at least one of generating a new pitch arrangement by allowing design variables of the pitch arrangements to cross over each other at a predetermined probability and of generating a new pitch arrangement by changing a portion of the design variable <mutation> of at least one of the pitch arrangements, determining the objective function, the constraint, and the fitness function of the pitch arrangement with the design variable changed; preserving said pitch arrangement and the pitch arrangement with the design variable not changed, an aforementioned process of step (b) being repeated until the pitch arrangement preserved reaches a predetermined number; determining whether or not a new group consisting of the predetermined number of the preserved pitch arrangement satisfies a predetermined convergence criterion; and if the convergence criterion is not satisfied, repeating a foregoing process of step (b) until the group subject to selection satisfies a predetermined convergence criterion by setting the new group as the group subject to selection; and if the predetermined convergence criterion is satisfied, determining the value of the design variable which gives the optimum value of the objective function among the predetermined number of the preserved pitch arrangement while taking the constraint into consideration.

More preferably, in step (b), with respect to the pitch arrangement with the design variable changed, the amount of change of the design variable which provides the optimum value of the objective function is estimated while taking the constraint into consideration on the basis of the sensitivity of the objective function, which is the ratio of the amount of change of the objective function to the amount of unit change of the design variable, and on the basis of the sensitivity of the constraint, which is the ratio of the amount of change of the constraint to the amount of unit change of the design variable, the value of the objective function when the design variable is changed by the amount corresponding to the estimated amount and the value of the constraint when the design variable is changed by the amount corresponding to the estimated amount are calculated, the fitness function is determined from the value of the objective function and the value of the constraint, said pitch arrangement and the pitch arrangement with the design variable not changed are reserved, and an aforementioned process of step (b) is repeated until the preserved pitch arrangement reaches the predetermined number.

Step (b) of the method of determining a pitch arrangement of a tire in accordance with the invention may comprise: estimating an amount of change to the design variable which gives the optimum value of the objective function while taking the constraint into consideration on the basis of a sensitivity of the objective function, which is a ratio of an amount of change of the objective function to an amount of unit change of the design variable, and a sensitivity of the constraint, which is a ratio of an amount of change of the constraint to an amount of unit change of the design variable; calculating a value of the objective function when the design variable is changed by an amount corresponding to the estimated amount and a value of the constraint when the design variable is changed by the amount corresponding to the estimated amount; and determining the value of the objective function on the basis of the estimated value and the calculated values while taking the constraint into consideration.

Further, the design variable can be a function representing the pitch arrangement.

If a function is set as the design variable, in order to keep a pitch length within a predetermined range when the design variable is varied in step (b), the constraint is determined, and the value of the design variable while taking the constraint into consideration is determined by executing step (b).

Moreover, it is possible to select the pitch arrangement having an optimal optimum value of an objective function among a plurality of the pitch arrangements after determining the plurality of the pitch arrangements corresponding to a plurality of initial arrangements by repeating, in the initial arrangement whose pitch is arranged to change its length step wise in order and the number of the pitch belonging to each step is predetermined, the steps of: (a) determining a model of the noise pulse generated each pitch and the objective function representing the physical amount for evaluating noise performance, (b) changing the numbers of the pitches belonging to the step between different steps, (c) determining the pitch arrangement on the basis of the number of the pitches in each step which gives the optimum value of the objective function.

It is also possible to determine the pitch arrangement in a method that, in the said pitch arrangement, for M blocks having a certain pitch when the blocks are arranged in order of the pitch length from the block having the maximum pitch length to the block having the minimum pitch length, an identifier i which shows a value representing the order from the identifier 1 showing the block of the minimum pitch length to the identifier M showing the block of the maximum pitch length M in order is arranged to increase its value in order, when an absolute value of the difference of the identifier of the adjacent blocks in a circumferential direction of the tire is D and the number of a pair of adjacent blocks having D greater than 1 is N, a ratio of D (the locations where the pitch changes) to N (all locations where the pitch changes) is 40% to 80%, where $2 \leq D \leq M-2$ ($4 \leq M$).

It is further possible to determine the pitch arrangement in a method that, in said pitch arrangement, when the number of the pitch arranged in the circumferential direction of the tire is P, a total of blocks having the maximum pitch length and blocks having the minimum pitch length is W, a ratio of W to P is 25%–50%.

In said pitch arrangement, when the blocks having the maximum pitch length and the blocks having the minimum pitch length are arranged in a row in the circumferential direction of the tire, the number of blocks of said groups may be 5 or less. Further, when blocks having a medium pitch length except the maximum pitch length and the minimum pitch length are arranged in a row in the circumferential direction of the tire, the number of the blocks of the groups may be 3 or less.

The invention will now be described in more detail,

In step (a) of the method of the invention, a model of a noise pulse generated in each pitch of the tire, the objective function representing a physical amount for evaluating noise performance of the tire, a design variable for determining the pitch arrangement, and a constraint for constraining the pitch arrangement are determined. As the model of the noise pulse, a sound level generated by a road surface and the pitch of the tire corresponding to the pitch length can be adopted. As the objective function representing a physical amount for evaluating noise performance of the tire, an amplitude value to a harmonic number working as a function of cycle/rotation of the tire, when the sound is generated in each pitch can be adopted. A square value of the amplitude, a difference value, and an average amplitude value can be also adopted. As a design variable for determining the pitch arrangement, the pitch length and the function representing the pitch arrangement can be adopted. As a constraint for constraining the pitch arrangement, adjacent pitch length ratios, a maximum pitch length ratio and a minimum pitch length ratio, and the number of pitches belonging to each pitch length, the number of the pitches having the same pitch length arranged in a row etc. can be adopted. It should be noted that the objective function, design variable and the constraint are not restricted to these examples and can be varied based on the purpose for designing the tire.

In step (b), a value of the design variable which gives the optimum value of the objective function while satisfying the constraint is determined. In this case, as described in the preferred method of the invention, it is effective to follow the steps of: step (a) comprising: determining a group subject to selection, consisting of a plurality of pitch arrangements; and determining, with respect to the pitch arrangements of the group subject to the selection, the objective function representing the physical amount for evaluating tire performance, the design variable for determining the pitch arrangements, the constraint for constraining at least one of adjacent pitch length ratios, a maximum pitch length ratio and a minimum pitch length ratio, the numbers of pitches belonging to each pitch length, the number of the pitches having the same pitch length arranged in a row, and the physical amount for evaluating performance, and a fitness function which can be evaluated from the objective function and the constraint; and step (b) comprising: selecting two pitch arrangements from the group subject to selection on the basis of the fitness function; effecting at least one of generating a new pitch arrangement by allowing design variables of the pitch arrangements to cross over each other at a predetermined probability and of generating a new pitch arrangement by changing a portion of the design variable of at least one of the pitch arrangements, determining the objective function, the constraint, and the fitness function of the pitch arrangement with the design variable changed; preserving said pitch arrangement and the pitch arrangement with the design variable not changed, an aforementioned process of step (b) being repeated until the pitch arrangement preserved reaches a predetermined number; determining whether or not a new group consisting of the predetermined number of the preserved pitch arrangement satisfies a predetermined convergence criterion; and if the convergence criterion is not satisfied, repeating a foregoing process of step (b) until the group subject to selection satisfies a predetermined convergence criterion by setting the new group as the group subject to selection; and if the predetermined convergence criterion is satisfied, determining the value of the design variable which gives the optimum value of the objective function among the predetermined number of the preserved pitch arrangement while taking the constraint into consideration.

In this case, as described above, it is further effective to follow the pitch arrangement, wherein in the above step (b), with respect to the pitch arrangement with the design variable changed, the amount of change of the design variable which gives the optimum value of the objective function is estimated while taking the constraint into consideration on the basis of the sensitivity of the objective function, which is the ratio of the amount of change of the objective function to the amount of unit change of the design variable, and on the basis of the sensitivity of the constraint, which is the ratio of the amount of change of the constraint to the amount of unit change of the design variable, the value of the objective function when the design variable is changed by the amount corresponding to the estimated amount and the value of the constraint when the design variable is changed by the amount corresponding to the estimated amount are calculated, the fitness function is determined from the value of the objective function and the value of the constraint, said pitch arrangement and the pitch arrangement with the design variable not changed are reserved, and an aforementioned process of step (b) is repeated until the preserved pitch arrangement reaches the predetermined number.

In this method, a value of the design variable which gives the optimum value of the objective function while satisfying the constraint is also determined. As a fitness function which can be evaluated from the objective function and the constraint, the function find fitness value of the pitch arrangement from the objective function and constraint can be used. It should be noted that the objective function, design variable, the constraint and the fitness function are not restricted to these examples and can be varied based on the purpose for designing the tire. As a method of a crossover of the design variable of the pitch arrangement, the design variable can partly be exchanged between two selected pitch arrangements or the design variable after a certain location can be exchanged between two selected pitch arrangements. As a method of changing a portion of the design variable, the design variable can be changed at a location set at a predetermined probability (mutation).

Also as described above, it is further effective to follow the step (b) comprising: estimating an amount of change of the design variable which gives the optimum value of the objective function while taking the constraint into consideration on the basis of a sensitivity of the objective function, which is a ratio of an amount of change of the objective function to an amount of unit change of the design variable, and a sensitivity of the constraint, which is a ratio of an amount of change of the constraint to an amount of unit change of the design variable; calculating a value of the objective function when the design variation is changed by an amount corresponding to the estimated amount and a value of the constraint when the design variable is changed by the amount corresponding to the estimated amount; and determining the value of the objective function on the basis of the estimated value and the calculated values while taking the constraint into consideration. In this case, a value of the design variable which gives the optimum value of the objective function while satisfying the constraint is determined.

As described above, as the design variable, a function representing the pitch arrangement can be used. In this case, if a function is set as the design variable, in order to keep a pitch length within a predetermined range when the design variable is varied in step (b), the constraint is determined, and the value of the design variable while taking the constraint into consideration is determined by executing step (b). Thus, the pitch length in the pitch arrangement comes to be within a predetermined range and prevents extreme large or small length.

In step (c) of the method of the invention, the pitch arrangement is determined on the basis of the design variable which gives the optimum value of the objective function by changing the model of the noise pulse of the tire, etc.

By repeating, in each of predetermined initial arrangements, the above mentioned steps, a plurality of the pitch arrangements corresponding to a plurality of the initial arrangements is determined. By selecting the pitch arrangement having an optimal optimum value, for example the pitch arrangement having the minimum amplitude value which is the objective function, among a plurality of the pitch arrangements, an optimum pitch arrangement which is more optimum than the other optimum pitch arrangements is selected. This pitch arrangement provides a tire which runs quietly.

The regularly arranged pitches provide a good appearance for the tread. Therefore, as described above, in step (a), a model of a noise pulse generated in each pitch of the tire and the objective function representing a physical amount for evaluating noise performance of the tire are determined. As the model of the noise pulse, a sound level generated by a road surface and the pitch of the tire corresponding to the pitch length can be adopted. As the objective function representing a physical amount for evaluating noise performance of the tire, an amplitude value corresponding to a harmonic number working as a function of cycle/rotation of the tire, when the sound is generated in each pitch, can be adopted. A square value of amplitude, a difference value and an average amplitude value can be also adopted. The objective function is not restricted to these examples and can be varied based on the purpose for designing the tire.

In step (b), the number of the pitches belonging to the step between different steps is changed. For example, the number of the pitches is changed by increasing the number of the pitches in one step while at the same time decreasing the number of the pitches in the other adjacent step. In this case, the total number of the pitches in the pitch arrangement does not change.

Further, in step (c), the pitch arrangement is determined by changing the total amount of the noise pulse etc. on the basis of the number of the pitches in each step which gives the optimum value of the objective function.

These steps are repeated in each initial arrangement whose pitch is arranged to change its length step wise in order and the number of the pitches belonging to each step is predetermined, for example the initial arrangement whose number of the pitches in each step is predetermined and is arranged so as to change its length step wise in order from the maximum length to the minimum length or the minimum length to the maximum length. Thus, a plurality of the pitch arrangements corresponding to a plurality of the initial arrangements are determined. By selecting the pitch arrangement having an optimal optimum value among a plurality of the pitch arrangements, an optimum pitch arrangement which is more optimum than the other optimum pitch arrangements is selected. This pitch arrangement provides a tire which runs quietly as well as maintaining a good appearance.

A method of determining a pitch arrangement of this invention, which is different from a conventional method of design and development, makes it possible to design in a best mode with respect to its noise evaluation at the same time to some extent, and to achieve effective design work and reduced cost of the development.

The pitch arrangement, as described above, can be classified into two types. A regular shape pitch arrangement is regularly arranged to have a good appearance. A random pitch arrangement is arranged without regularity.

The regular shape pitch arrangement provides good appearance because of its arrangement from the large pitch to the small pitch and the small pitch to the large pitch. With respect to a noise reduction effect which reduces noise when running, the random pitch arrangement which is arranged to improve the noise reduction effect by reducing the noise when running provides better performance.

In the random pitch arrangement, however, because the block having the maximum pitch length sometimes happens to be arranged next to the blocks having the minimum pitch length, a difference in rigidity resulting in generation of an irregular wear is easily brought about. Therefore, the noise performance which is excellent at the beginning of use of the tire deteriorates as time goes by.

In order to decrease the generation of the irregular wear as well as to improve the noise reduction effect achieved by the random pitch arrangement, a pitch arrangement which can decrease the difference in rigidity of the blocks adjacent to each other is effectively determined by the following method.

That is, in the pitch arrangement, as for M blocks having a certain pitch length when the blocks are arranged in order of the pitch length from the block having the maximum pitch length to the block having the minimum pitch length, an identifier i which shows a value representing the order from the identifier 1 showing the block of the minimum pitch length to the identifier M showing the block of the maximum pitch length M in order is arranged so as to increase its value in order, when an absolute value of the difference of the identifier of the adjacent blocks in a circumferential direction of the tire is D and the number of a pair of adjacent blocks having number of pairs of adjacent blocks having D greater than 1 is N, a ratio of D (the locations which satisfies the following expression to N is 40% to 80%, where $$2 \leq D \leq M-2 (4 \leq M).$$

In this method, when the block having the maximum length with the large rigidity and the block having the minimum length with the small rigidity are arranged adjacent to each other in the circumferential direction of the tire, the number of the blocks is taken into consideration, and the pitch arrangement can be determined while restraining the pitch arrangement of which the irregular wear is easily generated. Thus, the pitch arrangement which prevents deterioration of the excellent noise performance can be determined by this method.

Further, also as described above, in said pitch arrangement, when the number of the pitch arrangement in the circumferential direction of the tire is P, a total of blocks having the maximum pitch length and blocks having the minimum pitch length is W, a ratio of W to P is 25%–50%.

By following this method, a ratio of the number of the blocks having the maximum length and the blocks having the minimum pitch length to the total amount of the pitches in the circumferential direction of the tire is 25%–50%. When the block having the maximum length with the large rigidity and the block having the minimum length with the small rigidity are arranged adjacent to each other, the pitch arrangement improving generation of the irregular wear is determined under constraint of the pitch length.

In this arrangement, if the number of blocks of said groups is 5 or less when blocks having the maximum pitch length and blocks having the minimum pitch length are arranged in a row in the circumferential direction of the tire, the noise caused by the arrangement of the block having the maximum pitch length and the minimum pitch length in a row is reduced, and the noise reduction effect when running is improved.

In said pitch arrangement, if the number of the blocks of the group is 3 or less when blocks having a medium pitch length except the maximum pitch length and the minimum pitch length are arranged in a row in the circumferential direction of the tire, the number of the blocks having the medium pitch length arranged in the circumferential direction of the tire among the blocks comes is 3 or less. So, the pitch arrangement in a row of the block having the medium pitch length is constrained in addition to constraint of the block having the maximum pitch length and the block having the minimum pitch length. Thus, the noise caused by the arrangement of the blocks in a row is reduced, and the noise reduction effect when running is improved.

In step (a) which comprises determining a group subject to selection, consisting of a plurality of pitch arrangements; and determining, with respect to the pitch arrangements of the group subject to the selection, the objective function representing the physical amount for evaluating tire performance, the design variable for determining the pitch arrangements, the constraint for constraining at least one of adjacent pitch length ratios, a maximum pitch length ratio and a minimum pitch length ratio, the numbers of pitches belonging to each pitch length, the number of the pitches having the same pitch length arranged in a row, and the physical amount for evaluating performance, and a fitness function which can be evaluated from the objective function and the constraint is fixed, step (b) can be comprised of the following steps (1) to (4): (1) selecting two pitch arrangements from the group subject to selection on the basis of the fitness function; (2) effecting at least one of generating a new pitch arrangement by allowing design variables of the pitch arrangements to cross over each other at a predetermined probability and of generating a new pitch arrangement by changing a portion of the design variable of at least one of the pitch arrangements; (3) determining the objective function, the constraint, and the fitness function of the pitch arrangement with the design variable changed by crossover or mutation, preserving said pitch arrangement and the pitch arrangement with the design variable not changed, an aforementioned process of steps (1) to (3) being repeated until the pitch arrangement preserved reaches a predetermined number, and determining whether or not a new group consisting of the predetermined number of the preserved pitch arrangement satisfies a predetermined convergence criterion; (4) if the convergence criterion is not satisfied, repeating a foregoing process of steps (1) to (4) until the group subject to selection satisfies a predetermined convergence criterion by setting the new group as the group subject to selection, and if the predetermined convergence criterion is satisfied, determining the value of the design variable which gives the optimum value of the objective function among the predetermined number of the preserved pitch arrangement while taking the constraint into consideration.

In step (3), it is effective to follow the method that, with respect to the pitch arrangement with the design variable changed, the amount of change of the design variable which gives the optimum value of the objective function is estimated while taking the constraint into consideration on the basis of the sensitivity of the objective function, which is the ratio of the amount of change of the objective function to the amount of unit change of the design variable, and on the basis of the sensitivity of the constraint, which is the ratio of the amount of change of the constraint to the amount of unit change of the design variable, the value of the objective function when the design variable is changed by the amount corresponding to the estimated amount and the value of the constraint when the design variable is changed by the amount corresponding to the estimated amount are calculated, the fitness function is determined from the value of the objective function and the value of the constraint, pitch arrangement and the pitch arrangement with the design variable not changed are reserved, and an aforementioned process of steps (1) to (3) is repeated until the preserved pitch arrangement reaches the predetermined number. The value of the design variable which gives the optimum value of the objective function while satisfying the constraint can be also determined.

DESCRIPTION OF THE PREFERRED EMBODIMENTS

Figure 1:
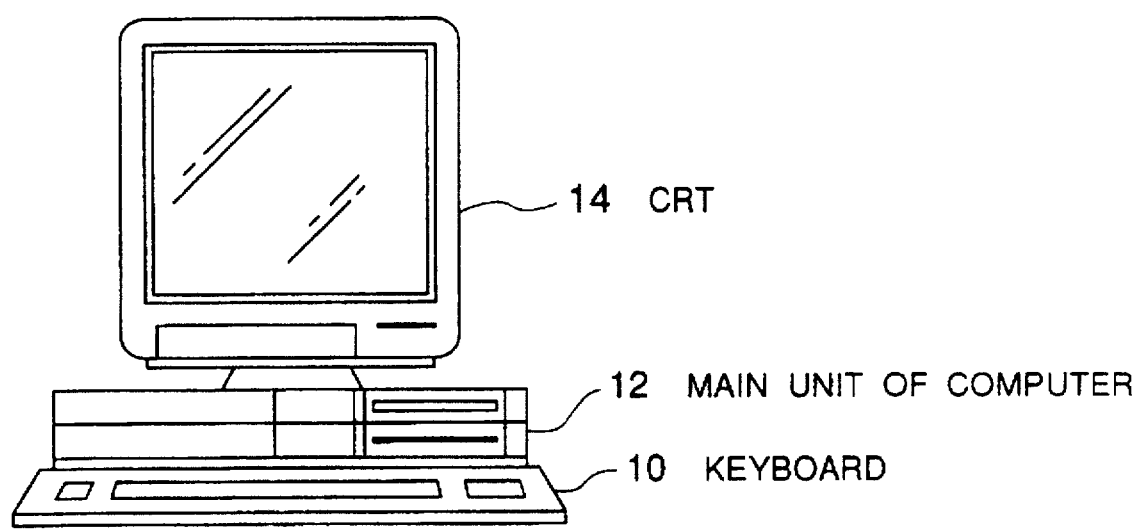
FIG. 1 is a schematic diagram of a personal computer used in the embodiments of the present invention.

The present invention will be explained with reference to the drawings. FIG. 1 shows an outline of a personal computer for carrying out the method of designing a pneumatic tire in accordance with the present invention. This personal computer comprises a keyboard 10 for entering data and the like; a main unit 12 for calculating design variables for satisfying a constraint in accordance with a program stored in advance, and for optimizing, e.g., maximizing or minimizing, an objective function; and a CRT 14 for displaying such as the results of calculation by the main unit 12 of the computer.

A first embodiment will be explained. In this embodiment, an optimum pitch arrangement and a pitch length ratio on the basis of a random pitch arrangement arranged without regularity are determined in order to improve the noise reduction effect.

Figure 2:
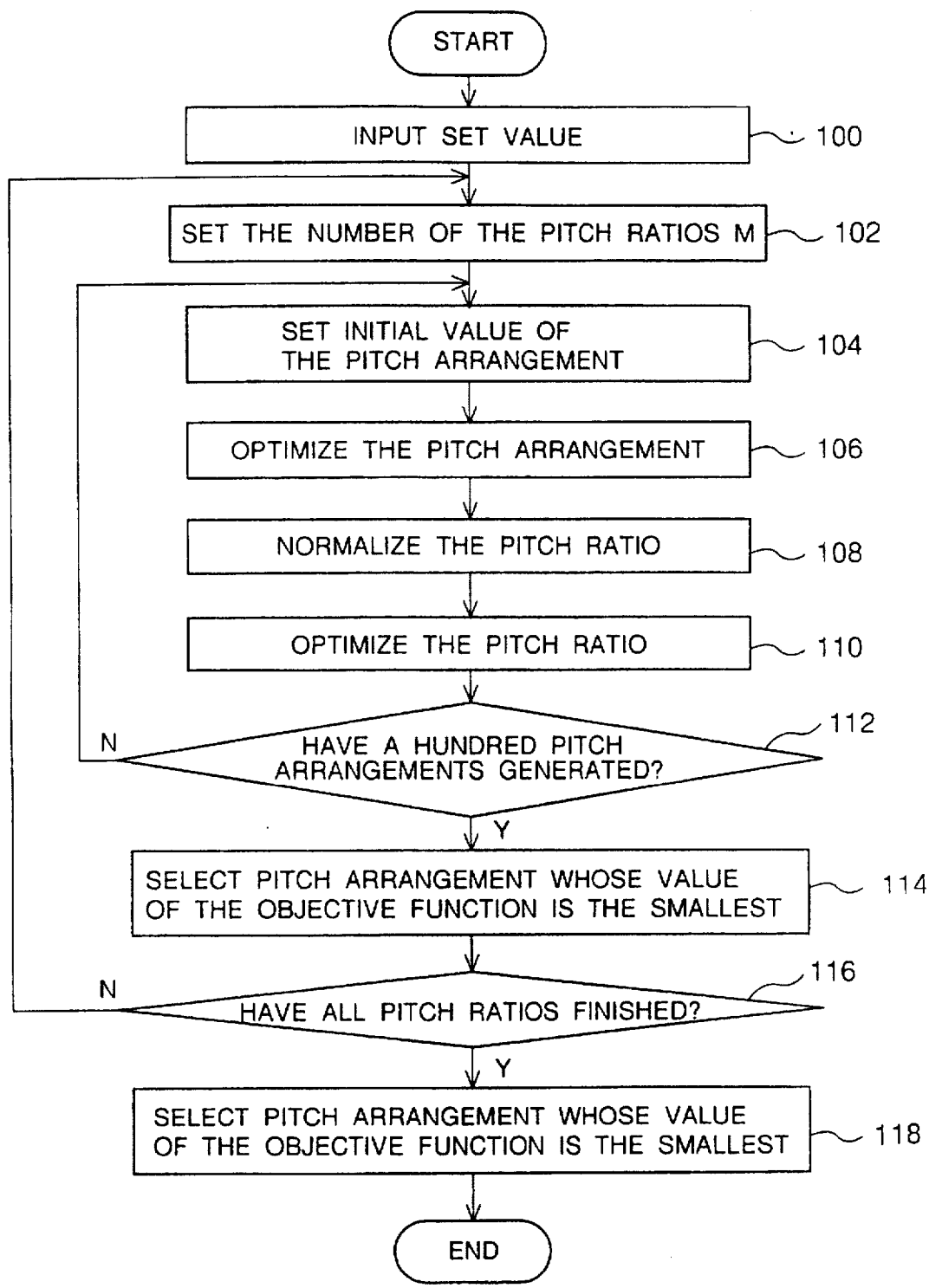
FIG. 2 is a flowchart illustrating a processing routine in accordance with a first embodiment of the present invention.
Figure 5:
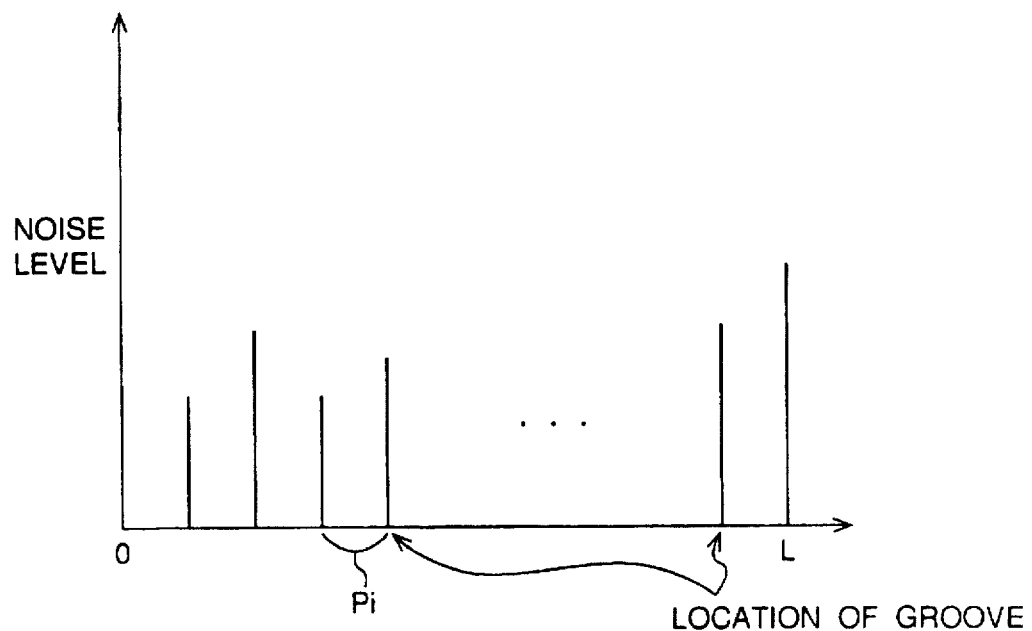
FIG. 5 is a diagram illustrating a basic model of a noise pulse of a tire.

FIG. 2 is a flowchart illustrating a processing routine in accordance with a first embodiment. In steps 100–104, as a model to determine the pitch arrangement arranged on a tread in a numerical and an analytical way, a basic model of a noise pulse representing the pitch and the noise generated by the pitch are determined (model of the noise pulse generated by each pitch of the tire). The term modelling referred to herein means the numerical representation of a pseudo random number into a format of input data for a computer program prepared according to a numerical and analytical technique. FIG. 5 is a graph of the basic model of the noise pulse, wherein the ordinate shows a level of the noise generated between a groove and a road surface when the groove of the tire contacts and leaves the road surface; the amplitude can be changed with respect to a block length or block rigidity; and Pi shows the pitch length.

In step 100, each value which is required and experimentally determined when determining quiet pitch arrangement is input as a set value.

Number of pitches: N

Constraint:

maximum pitch length ratio:=11.0 minimum pitch length ratio:=7.0 pitch length ratio adjacent each other:

$$\alpha_{min} \leq P_i/P_{i+1} \leq \alpha_{max}$$

$$\alpha_{min} \leq P_1/P_N \leq \alpha_{max}$$

wherein $\alpha_{min}$ and $\alpha_{max}$ are given constants.
For example, $\alpha_{min}=1/1.45$ $\alpha_{max}=1.45$ Objective function OBJ: when an amplitude A(n) is a value corresponding to a harmonic number n working as a function of cycle/rotation of the tire when a sound is generated in each pitch and an area of predetermined harmonic number is $n_{min}$–$n_{max}$, and is represented by the following formula.

$$\text{Objective function} = \sum_{i=n_{min}}^{n_{max}} \{A(i) - \bar{A}\}^2 \quad (1)$$

wherein:

$$\bar{A} = \frac{1}{n_{max} - n_{min} + 1} \cdot \sum_{i=n_{min}}^{n_{max}} A(i)$$

The following two formulae can also represent the objective function.

$$\text{Objective function} = \sum_{i=n_{min}}^{m_{max}} A(i)^2$$

Objective function=minimum value of A(i).

As the design variable, the N–1 pitch length Pi(i=1,2 , , , N–1) is set.

The amplitude A (n) to the harmonic number n is calculated as follows. A location Xi (i=1,2, , , , N) among pitches is calculated based on each pitch length $P_i$ of the pitch arrangement and the pitch ratio.

$x_1 = P_1$ $x_i = x_{i-1} + P_i$

A time history is determined by a Dirac function using the distance between the pitches $x_i$.

$F(x_i)=1$ $F(x)=0(X \neq x_i, i=1-N)$

Figure 6:
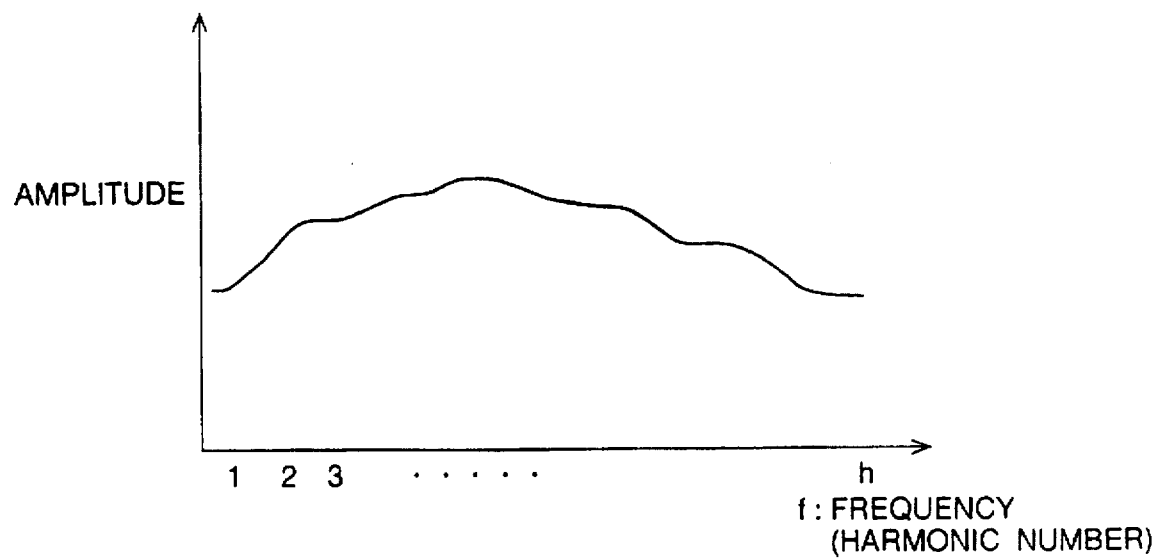
FIG. 6 is a diagram illustrating the relation of harmonic number and amplitude.

After analyzing F(x) within a range of 0 $\leq x \leq L$ (L is the circumferential length of the tire), the amplitude A (n) with respect to a harmonic working number n=cycle/rotation is calculated (refer to FIG. 6).

In this embodiment, δ function of Dirac is used for F(x), the noise generated by one pitch of the tire measured in an anechoic chamber can be also used. Also, a formula which can approximately represent a characteristic of the measured noise can be used.

$F(x)=e^{-a(x-x_i)} \sin(b (x-x_i)) (x \geq x_i)$ $F(x)=0 (x < x_i)$

In this formula, a and b are parameters which curve fit the measured noise.

In step 102, the number of the pitch ratios M is determined (M must be a natural number; in this embodiment, one natural number from 2–9). In step 104, a plurality of the pitch arrangements V whose number of the pitch ratio is M and total number of pitches is N are generated by pseudo random number algorithms. One pitch arrangement which satisfies the constraint about the adjacent pitch ratios is selected as an initial value.

M pitch ratios are assigned to the natural numbers from 1–9, and N figures of the arrangements are generated by the pseudo random number algorithms. Thus, the pitch arrangement V whose pitch ratio corresponds to each figure of the natural number showing an arrangement value is generated.

Next, one pitch arrangement which satisfies the constraint about the adjacent pitch ratios is selected as an initial value. In this embodiment, the following processes are done for cases of M=2,3, , , , 9 as the number M of the pitch ratio.

Figure 3:
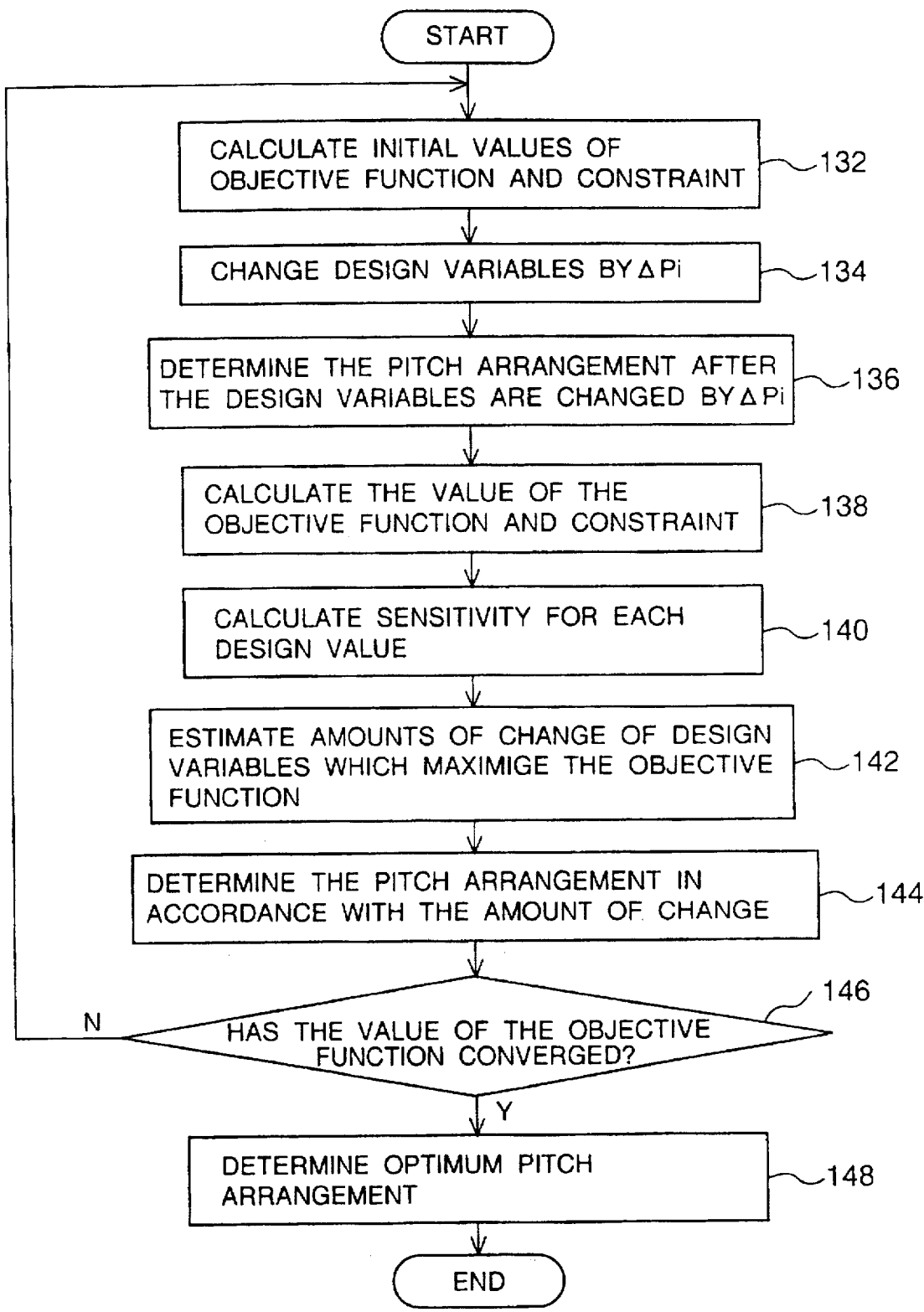
FIG. 3 is a flowchart of an optimization routine of a pitch arrangement of step 106 in FIG. 2.

In an ensuing step 106, the pitch arrangement V selected as the initial value based on an optimization routine in FIG. 3 is optimized. Next, in step 132, the initial value OBJo of the objective function and the initial value Go of the constraint G at the initial value Po of the design variable Pi are calculated.

In an ensuing step 134, the design variable ri is changed by $\Delta P_i$ each so as to change the basic model of the noise pulse. In step 136, the pitch arrangement after the design variable is changed by $\Delta P_i$ is determined.

In step 138, a value OBJ($P_i$+$\Delta P_i$) of the constraint after the design variable is changed by $\Delta P_i$ are calculated with respect to the pitch arrangement determined in step 136. In step 140, a sensitivity $\Delta$OBJ/$\Delta P_i$ of the objective function, which is a ratio of an amount of change of the objective function to an amount of unit change of the design variable, as well as a sensitivity $\Delta G_i/\Delta P_i$ of the constraint, which is a ratio of an amount of change of the constraint to an amount of unit change of the design variable, are calculated for each design variable in accordance with the following formula:

$$\text{Sensitivity} = \Delta OBJ/\Delta P_i \quad (4)$$
$$= \frac{OBJ(P_i + \Delta P_i) - OBJ(P_i)}{(P_i + \Delta P_i) - P_i}$$

By means of these sensitivities, it is possible to estimate to what extent the value of the objective function and the value of the constraint change when the design variable is changed by $\Delta P_i$. It should be noted that these sensitivities are sometimes determined analytically depending on the technique used in molding the tire noise and the nature of the design variable, in which case the calculation of step 138 becomes unnecessary.

In an ensuing step 142, an amount of change of the design variable which maximizes the objective function while satisfying the constraint is estimated by means of mathematical programing by using the initial value OBJo of the objective function, the initial value Go of the constraint, the initial value Po of the design variable, and the sensitivities.

In step 144, by using this estimated value of the design variable, a pitch arrangement is determined in a method similar to that of step 136, and a value of the objective function is calculated. In step 146, a determination is made as to whether or not the value of the objective function has converged by comparing a threshold value inputted in advance with the difference between the value OBJ of the objective function calculated in step 144 and the initial value OBJo of the objective function calculated in step 132. If the value of the objective function has not converged, steps 132 through 146 are executed repeatedly by setting as the initial value the value of t he design variable determined in step 142. If it is determined that the value of the objective function has converged, the value of the design variable at this juncture is set as the value of the design variable which maximizes the objective function while satisfying the constraint, and the optimized pitch arrangement is determined in step 148 by using this value of the design variable.

Next, in step 108, the pitch ratio of the optimized pitch arrangement is normalized. The initial normalized pitch ratio $r_i$ is determined based on the number of the pitch ratio M in accordance with the following formula:

$$r_i = \left\{ r_{min} + \frac{i-1}{M-1} \cdot (r_{max} - r_{min}) \right\} / \left( \frac{r_{min} + r_{max}}{2} \right) \quad (5)$$

wherein:

$r_{max}$ is the maximum pitch length ratio and $r_{min}$ is the minimum pitch length ratio. The optimized pitch length $P_i$ is divided by an average value of the pitch length in accordance with the following formula (6):

$$AP_i = P_i / \left( \frac{L}{\sum_{i=1}^{M} r_i M_i} \right) \quad (6)$$

$m_i$ is the number of the pitches whose pitch ratio is $r_i$ and $\sum_{i=1}^{M} m_i = N$ wherein:
Pi: i=1, 2, ..., N-1

$$Pn = L - \sum_{i=1}^{N-1} Pi$$

L: circumferential length of the tire.

After the value APi which is optimized and divided by the average value is replaced by the normalized pitch ratio which is the most close to the APi, the pitch arrangement is reproduced by the number of the pitch ratio M.

Figure 4:
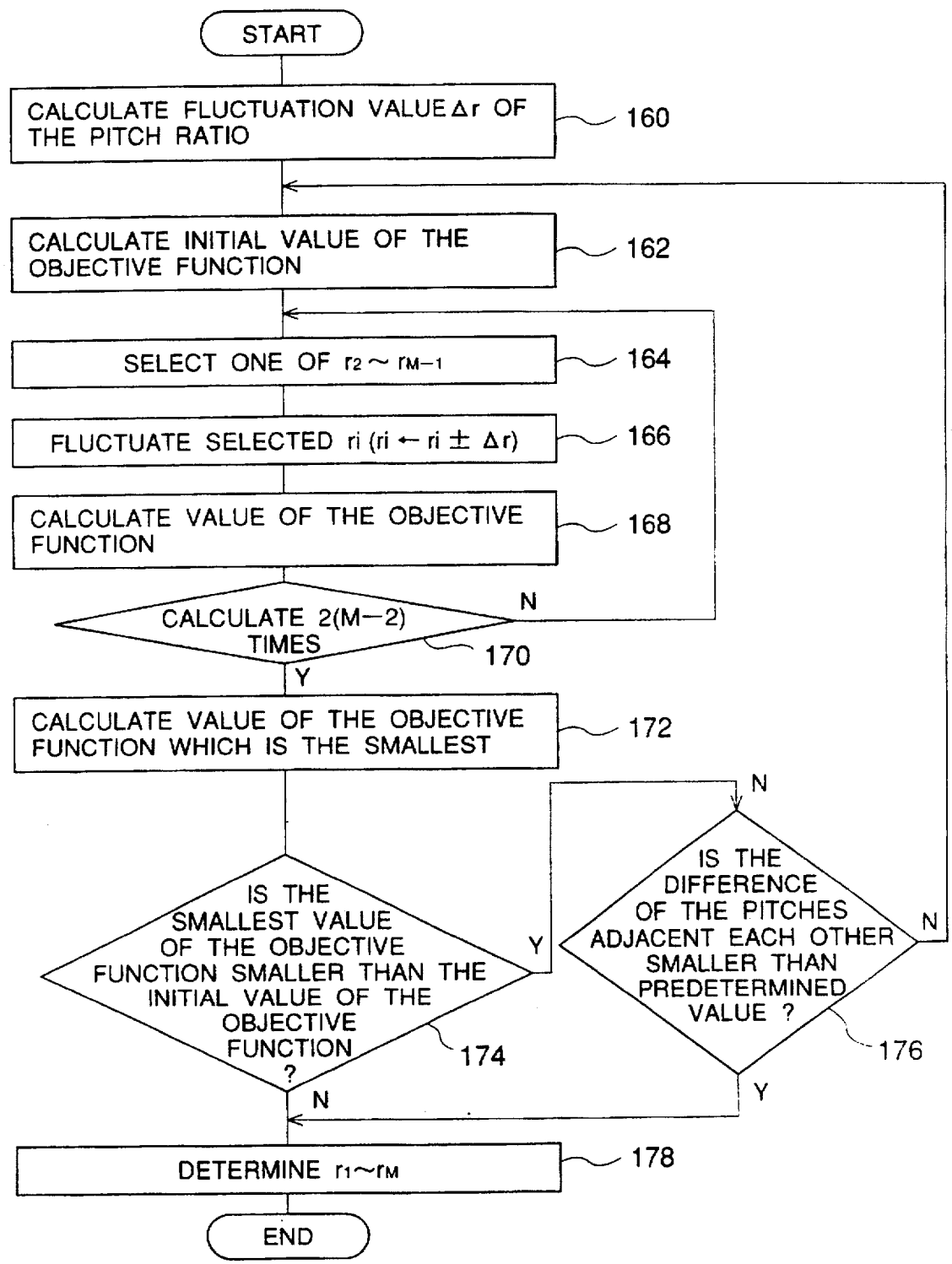
FIG. 4 is a flowchart of a optimization routine of the pitch arrangement of step 110 in FIG. 2.

In an ensuing step 110, each pitch of the pitch arrangement which is represented by the number of the pitch ratio M is optimized in accordance with an optimizing routine of FIG. 4, the pitch ratio from $r_2$ to $r_{m-1}$ is optimized as the values of the first pitch ratio ri and the last pitch ratio rm are fixed. In step 160 of the optimizing routine, for the purpose of increasing and decreasing the value of the pitch ratio $r_2$–$r_{M-1}$, a fluctuation value $\Delta r$ is calculated. In this embodiment, the value of $(r_M-r_1)/10$ is calculated with the fluctuation value $\Delta r$. In an ensuing step 162, the value of the initial objective function OBJO is calculated. In step 164, one pitch ratio is selected among $r_2$–$r_{M-1}$. In step 166, the pitch ratio ri is increased or decreased, and afterward a new value of the objective function OBJ is calculated in step 168. In step 170, a determination is made whether or not all of the increase and decrease of $r_2$–$r_{M-1}$ has been calculated (2(M-2)) times. If it has been calculated, in step 172 the value of the objective function whose value is the smallest is calculated among 2(M-2) objective function calculated in step 168. In an ensuing step 174, the initial value of the objective function and the smallest value of the objective function calculated in step 172 are compared. If the smallest value of the objective function is greater than the initial value of the objective function, since further improvement is not expected, the optimum pitch ratio $r_1$–$r_M$ is outputted in step 178. On the other hand, if the smallest value of the objective function is smaller than the initial value of the objective function in step 174, a determination is made as to whether or not a difference between the pitch ratios $r_1$ and $r_{i+1}$ adjacent to each other is smaller than a certain value (predetermined value) in accordance with the following formula (7) in step 176. If it is not smaller, step 162 is applied, and if it is smaller, step 178 is applied. Thus, the optimum pitch ratio $r_1$–$r_M$ is outputted.

$$r_{i+1} - r_i < \frac{r_{max} - r_{min}}{2(M-1)} \quad (7)$$

wherein:
i=1–M–1.

In an ensuing step 112, a determination is made whether or not a hundred pitch arrangements V are generated. Steps 104–110 are repeated until the generation of a hundred pitch arrangements V. After the generation of a hundred pitch arrangements V, the pitch arrangement and the pitch ratio having the smallest objective function are selected.

In an ensuing step 116, a determination is made whether or not above process has been finished, and if not so, step 102 to step 114 are executed. After finishing optimization of the pitch ratio and the pitch arrangement for all M pitch ratios, step 118 is applied. In step 118, among each optimized pitch ratio and pitch arrangement in every number of the pitch ratio, the pitch ratio and the pitch arrangement which give the optimum value of the objective function are selected. Thus, this routine ends.

Figure 7:
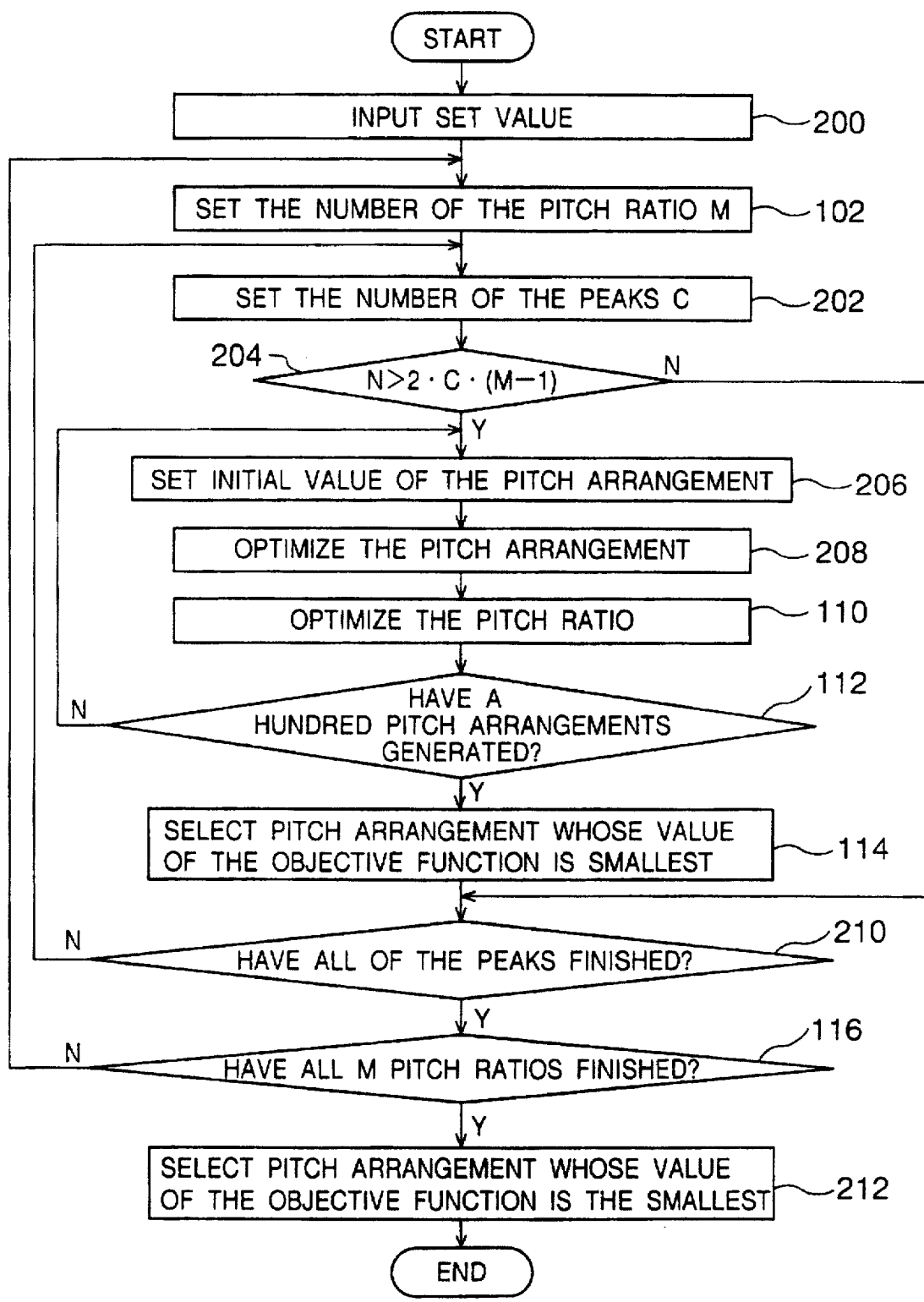
FIG. 7 is a flowchart illustrating a processing routine in accordance with a second embodiment of the present invention.

By determining the pitch ratio and the pitch arrangement in such way, the optimum pitch arrangement which provides a minimum scattering of the amplitude of the noise, so called white noise, is selected among a plurality of the optimum pitch arrangements (100 pcs) corresponding to the predetermined initial arrangement. Accordingly, a design of the tire which runs quietly can be accurately achieved without many calculations A second embodiment which provides an optimum pitch arrangement arranged in a regular shape and pitch ratio will be explained. This embodiment is explained with reference to FIG. 7.

Figure 9:
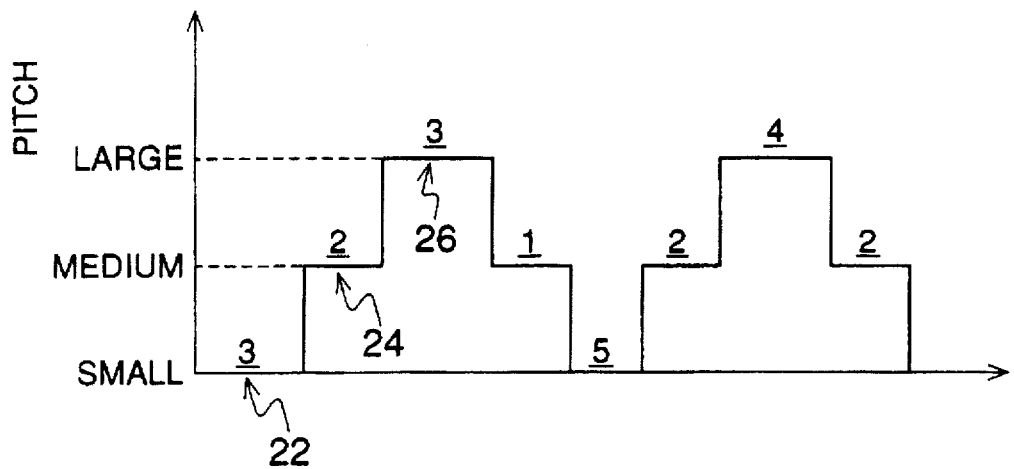
FIG. 9 is an image drawing of a regular shape pitch arrangement.

In this regular shape pitch arrangement, the pitches are arranged from small pitches to large pitches and vice versa in order. In FIG. 2, there are 2 peaks which means a group consisted of the large pitches arranged in a row. The number of steps H which is formed when the pitch changes is shown by the following formula (8).

$$H=2C+2C \cdot (M-2)=2C \cdot (M-1) \quad (8)$$

wherein;

C: The number of the peak (2 in FIG. 9)
M: The number of the pitch ratio.

In step 200, a set value experimentally required for designing a quiet tire, and the number of the pitch ratios M is determined in step 102. In this embodiment, a constraint for the pitch ratios adjacent to each other for designing the random pitch arrangement is omitted.

The objective function, the constraint and the design variable are as follows.

Objective function OBJ: Spectrum deviation of the tire noise in accordance with the formula (1) Constraint: the number of pitches in one step is one or more
: maximum pitch length ratio=11.0
: minimum pitch length ratio=7.0
  wherein $P_i$: pitch length
  (i=1,2, ..., N)

Design variable: The number of the pitches arranged in each step (H).

In an ensuing step 202, the number of the peaks in the circumference of the tire is determined. The number of the peaks C is assigned a number from 1 to 9. In an ensuing step 204, a determination is made as to whether or not the number of the steps H calculated in accordance with the formula (8) on the basis of the number of the pitch ratios M and the number of the peaks C is smaller than the amount of the pitches. If it is smaller, step 206 is applied.

In step 206, the number of the pitches Uj (j:1–2 C (M-1)) in each 2·C·(M-1) step is determined by the pseudo random number algorithms. 2·C·(M-1) steps are assigned to the natural number from 1–9, and the arrangements are generated by the pseudo random number algorithms. Next, one pitch arrangement V whose number of the pitches Uj in each step corresponds to the natural number showing an arrangement value is selected as an initial value. The pitch length and the number of the pitches in the steps of the regular shape pitch arrangement are described in FIG. 9 when the number of the peaks C is 2. Numbers with underline in steps show the number of the pitches Uj in FIG. 9.

Figure 8:
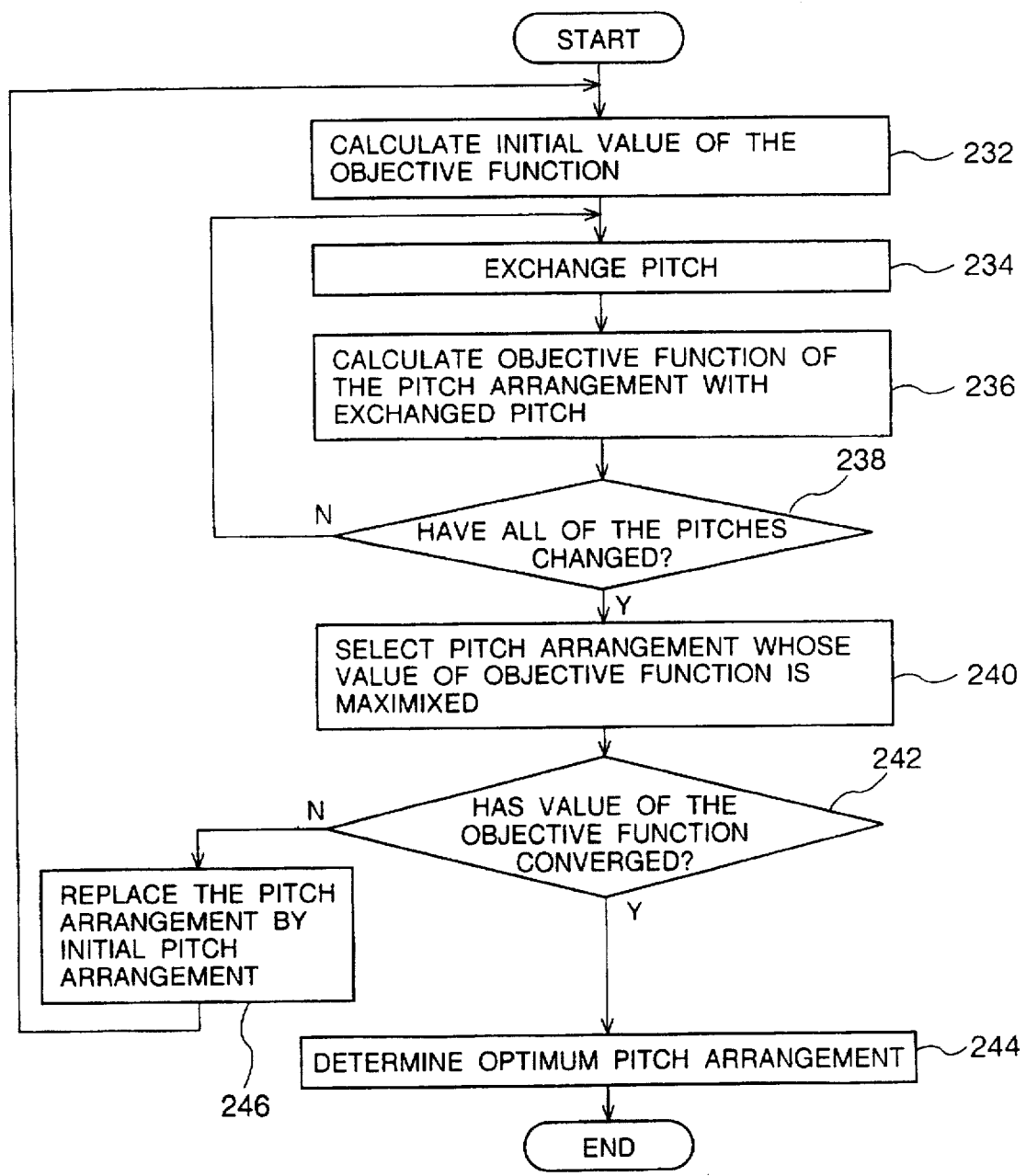
FIG. 8 is a flowchart of an optimization routine of a pitch arrangement of step 208 in FIG. 2.
Figure 10:
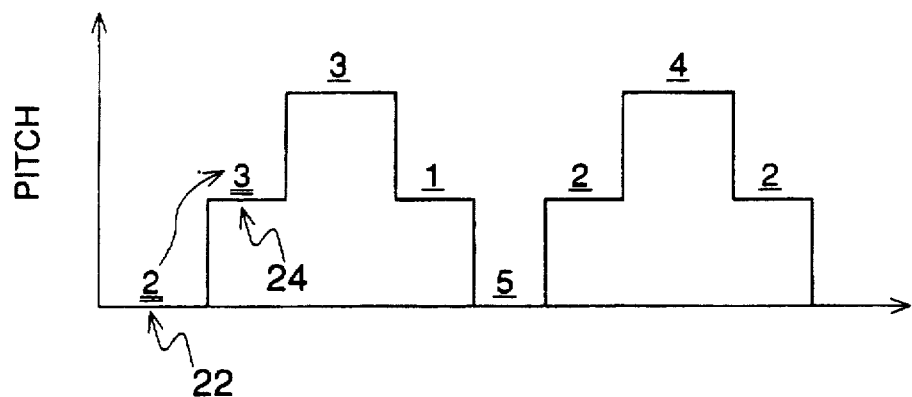
FIG. 10 is an image drawing of an optimization routine of the regular shape pitch arrangement.
Figure 11:
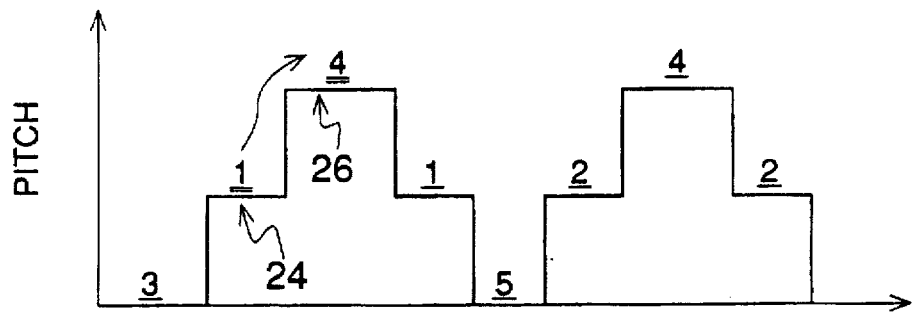
FIG. 11 is another image drawing of an optimization routine of the regular shape pitch arrangement.

In step 208, the regular shape pitch arrangement selected as the initial value based on an optimization routine in FIG. 8 is optimized. Next, in step 232 of the optimization routine of FIG. 8, an initial value OBJo of the objective function OBJ determined for the regular shape pitch arrangement selected as the initial value are calculated. In step 234, the number of the pitches of two of the steps is increased or decreased. When the number of the peaks C is 2, the number of the pitches U in the step 22 of a small pitch is 3, the number of the pitches U in the step 24 of a medium pitch is 2, and the number of the pitches U in step 26 of a large pitch are selected as the initial value of the regular shape pitch arrangement (refer to FIG. 9), the number of the pitches of the small pitches in the step 22 is decreased by 1 and the number of the pitches in step 24 is increased by 1 as shown with double underlines in FIG. 10. Another case, when the number of the pitches in the step 22 of the small pitch is decreased by 1 and the number of the pitches in the step 24 of the medium pitch is increased by 1, is shown in FIG. 11 with the double underlines.

Thus, the value of the objective function of the regular shape pitch arrangement is calculated in step 236, when the number of the pitches is decreased or increased. The above procedure is applied repeatedly until an exchange of the number of the pitches between the steps has been done for all of the steps (step 238). In step 240, among a plurality of the objective functions calculated corresponding to the initial value OBJo of the objective function OBJ, one regular shape pitch arrangement whose objective function gives a minimum value is selected. In step 242, a determination is made whether or not the value of the objective function has converged by comparing the initial value OBJo of the objective function. If the value of the objective function has not converged, the above procedure is executed repeatedly by replacing the initial pitch arrangement selected in step 240 by the pitch arrangement in step 246 until convergence of the objective function. If the value of the objective function has been converged, the regular shape pitch arrangement at the convergence of the value of the objective function is selected as the optimum pitch arrangement in step 244.

As the first embodiment, the pitch ratios from $r_2$ to $r_{M-1}$ are optimized as the values of the first pitch ratio $r_1$ and the last pitch ratio $r_M$ are fixed (step 110, FIG. 4). Then, a determination is made whether or not a hundred pitch arrangements V are generated. Among a hundred pitch arrangements V, the pitch arrangement and the pitch ratio having the smallest objective function are selected (step 112, 114).

In step 210, a determination is made whether or not the optimized pitch ratio and pitch arrangement have been calculated for each of the numbers of the pitch arrangements C. If not, step 202 is applied again, and the above procedure is executed until the optimized pitch ratio and pitch arrangement are obtained for all of the numbers of the peak C.

In an ensuing step 116, a determination is made whether or not the above procedure has been applied for all of the numbers of pitch ratio M. If not, step 102 is applied again, and the above procedure is executed until the optimized pitch ratio and pitch arrangement are obtained for all of the numbers of the pitch ratio M. In step 212, among each optimized pitch ratio and pitch arrangement in every number of the pitch ratio including the number of the peaks C, the pitch ratio and the pitch arrangement which give the optimum value of the objective function are selected. Thus this routine ends.

Thus, in this embodiment, a plurality of the optimum pitch arrangement (100 pcs) corresponding to each of the predetermined regular shape pitch arrangements are determined, and the optimum pitch arrangement which provides a minimum scattering of the amplitude of the noise, so called white noise, is selected among a plurality of the optimum pitch arrangements. Therefore, it is possible to determine, accurately without many calculations, the pitch ratio and the pitch arrangement of the tire which runs quietly and with a good appearance.

Figure 12:
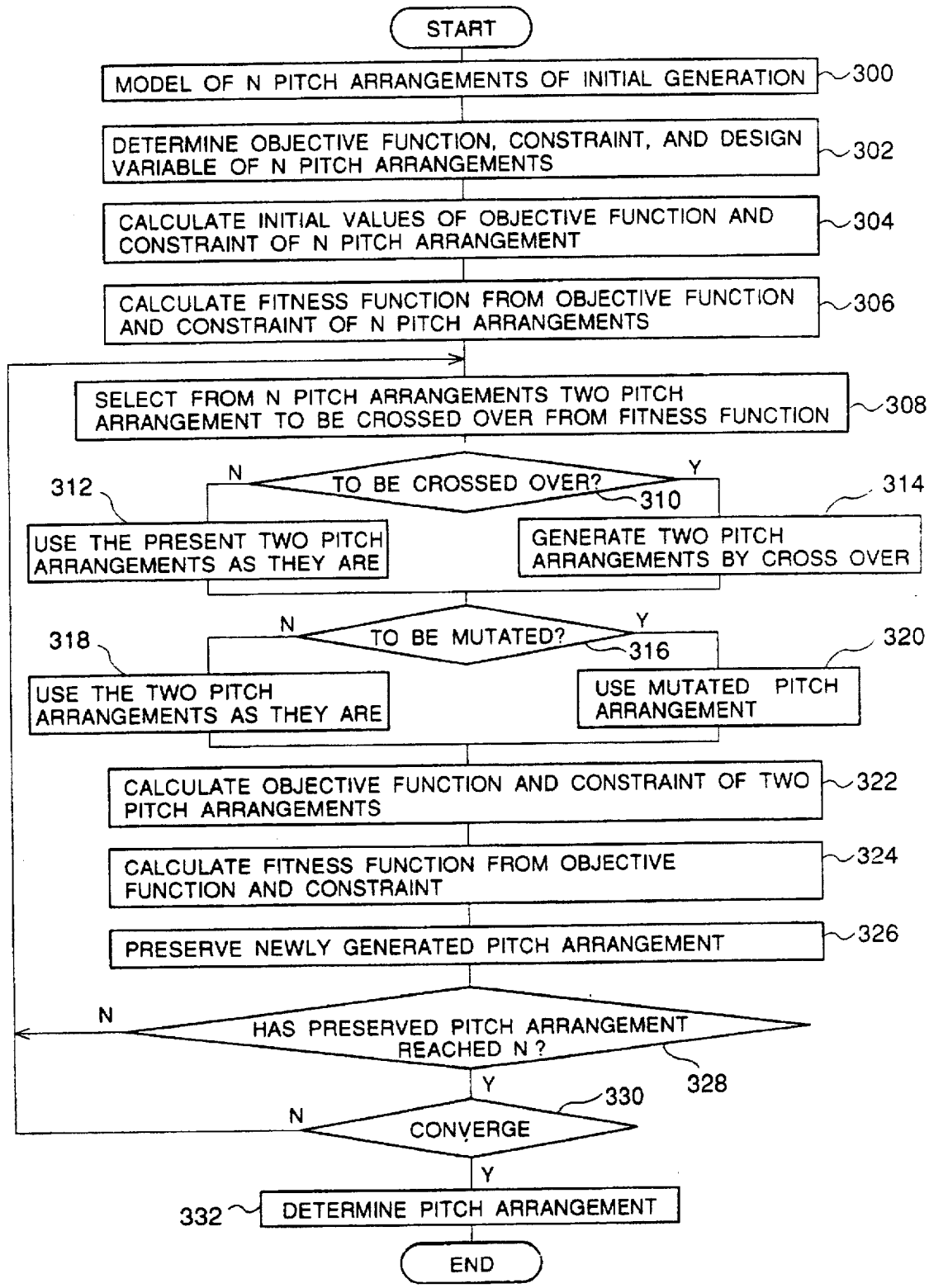
FIG. 12 is a flowchart illustrating a processing routine in accordance with a third embodiment of the present invention.

Next, a description will be given of a third embodiment in which the pitch arrangement is designed by genetic algorithm. FIG. 12 shows a program processing routine in accordance with the third embodiment. In step 300, N pitch arrangements are determined based on the pseudo random number. N is inputted by a user in advance. A basic model of a noise pulse is the same as that of the first embodiment.

In an ensuing step 302, the objective function representing the physical amount for evaluating tire performance, the design variable for determining the pitch arrangements, the constraint for constraining at least one of adjacent pitch length ratios, a maximum pitch length ratio and a minimum pitch length ratio, the numbers of pitches belonging to each pitch length, the number of the pitches having the same pitch length arranged in a row, and the physical amount for evaluating performance and a design variable for determining N pitch arrangements are determined. In this embodiment, in order to design the pitch arrangement which can provide an excellent noise performance, the objective function OBJ and the constraint G are determined as follows.

Objective function: Tire noise spectrum deviation in accordance with formula (1)
  Constraint: regular shape pitch arrangement or not
  maximum pitch length ratio:=11.0
  minimum pitch length ratio:=7.0
  pitch length ratio adjacent each other:

$$\alpha_{min} \leq P_i/P_{i+1} \leq \alpha_{max}$$

wherein $\alpha_{min}$ and $\alpha_{max}$ are given constants
For example, $\alpha_{min}=1/1.45$ $\alpha_{max}=1.45$ wherein Pi is the pitch length.

After each design variable $r_{OJ}$ (J=1,2, . . , N) of the objective function OBJ, the constraint G and N pitch arrangements are determined, in each of the design variables $r_{OJ}$ for N pitch arrangements, the objective function $OBJ_J$ and the constraint $G_J$ are calculated.

In an ensuing step 306, in each of N pitch arrangements, the fitness function $F_J$ is calculated in accordance with the following formula (9) using the objective function $OBJ_J$ and the constraint $G_J$ calculated in step 304. In this embodiment, for example, in order to minimize the spectrum deviation, a value of the fitness function (fitness value) increases as the spectrum deviation decreases.

$$\Phi_J = OBJ_J + \gamma \cdot \max(G_J, 0)$$

$$F_J = \Phi_J \quad (9)$$

or $$F_J = 1/\Phi_J$$

or $$F_J = a \cdot \Phi_J + b$$

wherein:

$$a = \frac{\Phi_{avg}(c-1)}{(\Phi_{avg} - \Phi_{min})} \quad b = \frac{\Phi_{avg}(c - \Phi_{min})}{(\Phi_{avg} - \Phi_{min})}$$

$$\Phi_{avg} = \frac{\sum_{J=1}^{N} \Phi_J}{N}$$

c: constant value

γ: penalty coefficient $\Phi_{min} = (\Phi_1, \Phi_2 \ldots, \Phi_N)$ $\Phi_J$: penalty coefficient of the J-th in Pieces of the pitch arrangement (J=1, 2,3, . . , N)

wherein:

c and γ are input by the user in advance.

In an ensuing step 308, two pitch arrangements to be crossed over each other are selected among the N pitch arrangements. As the method of the selection, a roulette wheel selection, which is generally known, is used. A probability $PRO_e$ with which certain individuals e among the N pitch arrangements are each selected in the selection is expressed by the following formula:

$$PR_e = \frac{F_e}{\sum_{J=1}^{N} F_J}$$

wherein $F_e$: fitness function of a certain individual e among the N pitch arrangements $F_J$: J-th fitness function among the N pitch arrangements (J=1,2,3, . . , N).

Although, in the above described embodiment, the roulette wheel selection is used as the method of selection, it is possible to alternatively use an expected-value strategy, a rank strategy, an elite preservation strategy, a tournament selection strategy, a Genitor algorithm, or the like, as shown in "Genetic Algorithms" (edited by Hiroaki Kitano).

In an ensuing step 310, a determination is made as to whether or not the two selected pitch arrangements are to be crossed over with each other by a probability T in advance by the user. The term crossover used herein means the exchange of certain elements of two pitch arrangements, as will be described later. If NO is the answer in the determination and crossover is not to be carried out, in step 312, the present two pitch arrangements are kept intact, and the operation proceeds to step 316. Meanwhile, if YES is the answer in the determination and crossover is to be carried out, in step 314, the two pitch arrangements are crossed over each other, as will be described later.

Figure 13:
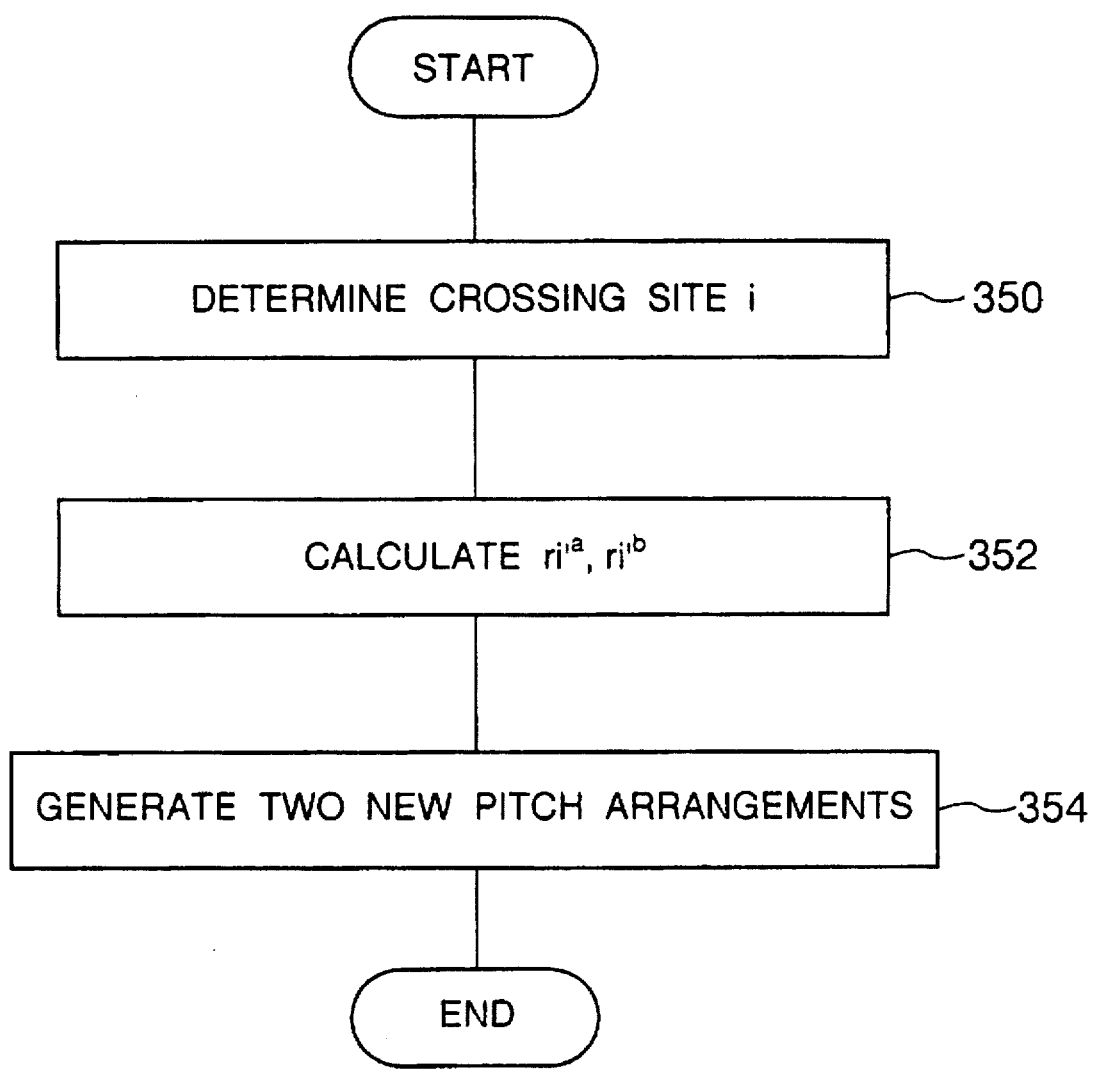
FIG. 13 is a flowchart illustrating a crossover routine.

The crossover of the two pitch arrangements is carried out in accordance with a crossover routine shown in FIG. 13. First, the two pitch arrangements selected in step 308 are set as a pitch arrangement a and a pitch arrangement b, and the design variables of the pitch arrangements a and b are expressed by design variable vectors Vr including lists. The design variable vectors of the pitch arrangement a are set as $Vr^a = (r_1^a, r_2^a, \ldots, r_i^a, \ldots, r_{n-1}^a)$, while the design variable vectors of the pitch arrangement b are set as $Vr^b = (r_1^b, r_2^b, \ldots, r_i^b, \ldots, r_{n-1}^b)$.

In step 350 in FIG. 13, predetermined random numbers are generated, and a crossing site cs concerning the design variable vectors of the pitch arrangement a, b is determined in accordance with the random numbers. New design variables $r_i'^a, r_1'^b$ are determined based on the crossing site i in step 352. How to determine the new design variables $r_i'^a, r_1'^b$ in detail is explained with reference to FIG. 14 and FIG. 15.

Figure 14:
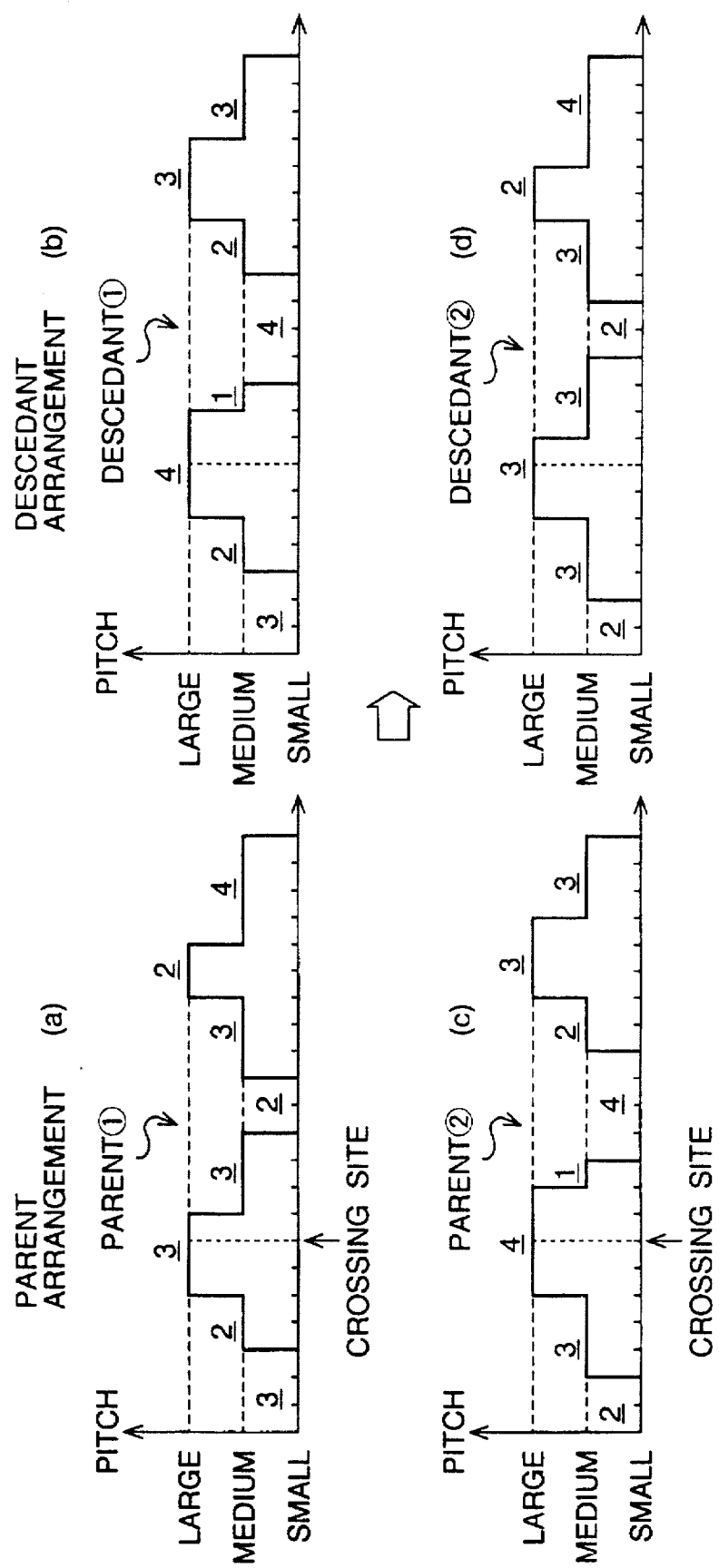
FIG. 14 is an image drawing illustrating the regular shape pitch arrangement during crossover, wherein; (a) shows a pitch arrangement a, (b) shows a pitch arrangement after crossover of parent pitch arrangements a and b, (c) shows a pitch arrangement b, (d) shows a pitch arrangement after crossover of parent pitch arrangements a and b.

The pitch arrangement in FIG. 14 is the regular shape pitch arrangement. This pitch arrangement consists of 22 pieces of pitches, and the pitches are arranged from small pitches to large pitches and vice versa in order. There are 2 peaks which consist of the large pitches arranged in a row. Numbers with underline in steps show the number of the pitches. If a large pitch ratio is 3, a medium pitch ratio is 2, and a small pitch ratio is 1, the pitch arrangements a, b (called parent (1), parent (2) hereinafter) in FIG. 14 are described as follows.

parent (1): 1112233322211222332222
parent (2): 1122233332111122333222

When, for example, a crossover at 7-th location is determined by the random number, following descendant pitch arrangements are generated from the parent pitch arrangements.

parent (1): 1112233/322211222332222
parent (2): 1122233/332111122333222
descendant (1): 1112233/332111122333222
descendant (2): 1122233/322211222332222

The former arrangement of the parent (1) before the crossing site is combined with the latter arrangement of the parent (2) after the crossing site. Thus, the pitch arrangement (called descendant (1) hereinafter) is generated on the basis of the parent (1).

The former arrangement of the parent (2) before the crossing site is combined with the latter arrangement of the parent (1) after the crossing site. Thus, the pitch arrangement (called descendant (2) hereinafter) is generated on the basis of the parent (2). In these cases, both the descendant (1) and descendant (2) have characteristics of the regular shape pitch arrangement.

Figure 15:
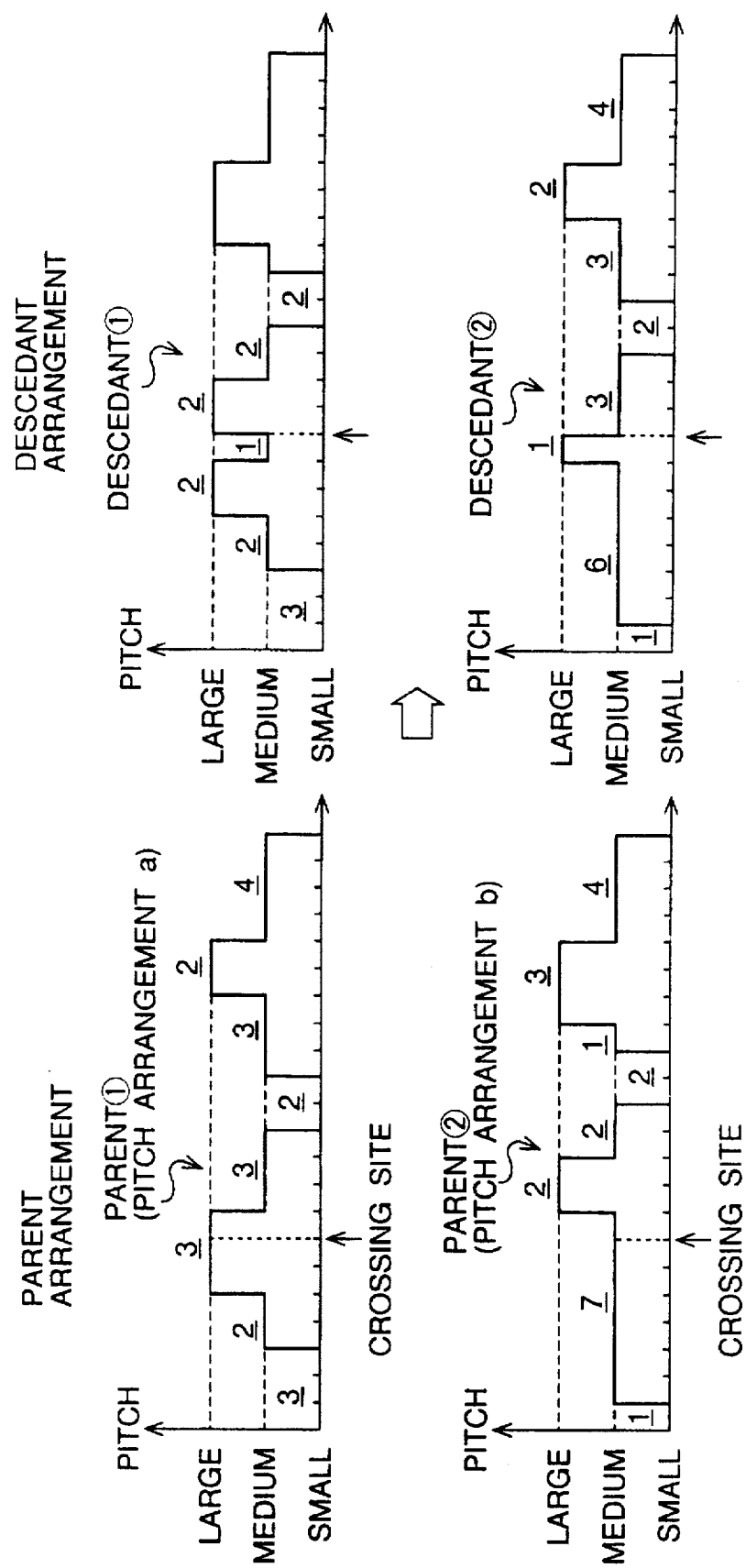
FIG. 15 is an image drawing illustrating another regular shape pitch arrangement during crossover.

As shown in FIG. 15, when the crossing site is in the medium pitch ratio or the small pitch ratio, though the descendant (2) has the characteristics of the regular shape pitch arrangement, descendant (1) does not have the characteristics of the regular shape pitch arrangement. Therefore, in order to generate the regular shape pitch arrangement at any time, if the constraint G is not the regular shape pitch arrangement, dominant by the pitch arrangement other than the regular shape pitch arrangement can be prevented by preserving a positive value in advance.

After $r_i'^a$, $r_i'^b$ are thus determined, in step 354, design variable vectors $V_r'^a$ and $V_r'^b$ which are lists of new design variables are determined as follows.

$Vr'^a = (r_1^a, r_2^a, \ldots, r_2'^a, r_{i+1}^b, \ldots, r_{n-1}^b)$
$Vr'^b = (r_1^b, r_2^b, \ldots, r_2'^b, r_{i+1}^a, \ldots, r_{n-1}^a)$ $Vr'^a = (r_1^a, r_2^a, \ldots, r_2'^a, r_{i+a}^b, \ldots, r_{n-1}^b)$ There is only one crossing site cs in the above described example; it is possible to alternatively use a plural-points crossover or uniform crossover such as those shown in "Genetic Algorithms" (edited by Hiroaki Kitano).

After two new pitch arrangements are generated by such a crossover, in step 316 in FIG. 12, a determination is made as to whether or not mutation is to take place at a probability S inputted in advance by the user. The term mutation referred to herein means changing a portion of the design variable by an infinitesimal degree, and is aimed at enhancing the probability of including a population capable of assuming optimum design variables. If NO is the answer in the determination in step 316 and a mutation is not to take place, in step 318, the present two pitch arrangements are kept intact, and the operation proceeds to an ensuing step 322. If YES is the answer in the determination and a mutation is to take place, mutation proceeding is carried out as follows in an ensuing step 320.

Figure 16:
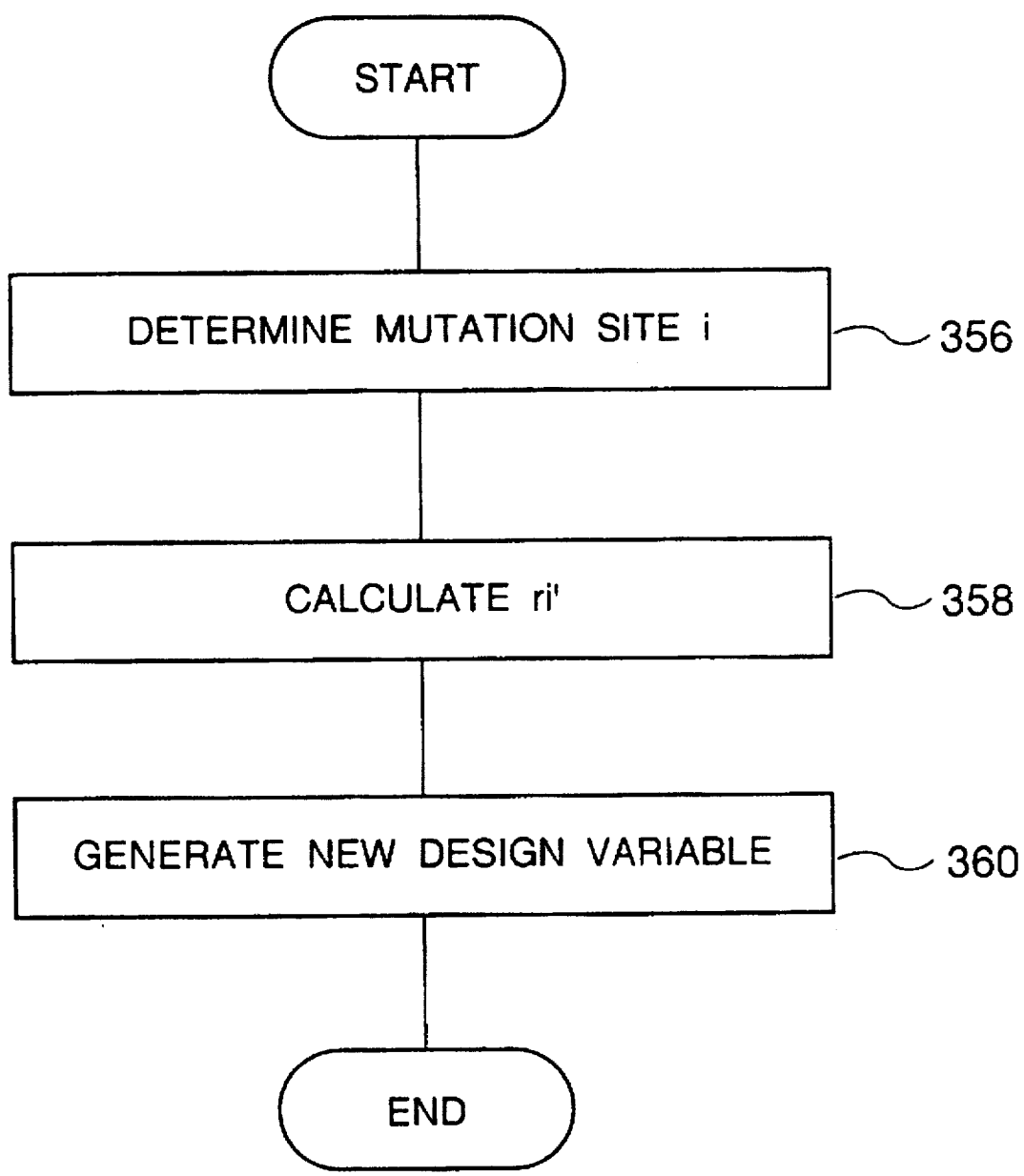
FIG. 16 is a flowchart illustrating a mutation processing routine.

This mutation is carried out by a mutation routine shown in FIG. 16. First, in step 356, random numbers are generated, and the mutation site ms is determined by the random numbers. A new design variable $r_i'$ is changed to an integer of the pitch ratio determined by the random numbers in step 358. After the design variable $r_i'$ is thus determined, a design variable vector V', i.e. a list of new design variables which is determined in step 360, becomes as follows:

$V_r' = (r_1, r_2, \ldots, r_i', r_{i+1}, \ldots, r_{n-1})$

With respect to the two pitch arrangements newly generated in the above described manner, the value of the objective function and the value of the constraint are calculated in step 322 in FIG. 12. In an ensuing step 324, a fitness function is calculated from the resultant values of the objective function and the constraint by using formula (9) in the same way as in the preceding embodiment.

In an ensuing step 326, the aforementioned two pitch arrangements are preserved. In an ensuing step 328, a determination is made as to whether or not the number of pitch arrangements preserved in step 326 has reached N, and if it has not reached N, step 308 through 328 are executed repeatedly until it reaches N. Meanwhile, if the number of pitch arrangements has reached N, a determination is made with respect to convergence in step 330. If a convergence has not been attained, the N pitch arrangements are updated to the pitch arrangements preserved in step 326, and step 308 through 330 are executed repeatedly. Meanwhile, if it is determined in Step 330 that a convergence has been attained, the value of the design variables of a pitch arrangement which give a maximum value of the objective function while substantially satisfying the constraint among the N pitch arrangements are set as values of the design variables which maximize the objective function while substantially satisfying the constraint. In step 332, the pitch arrangement is determined by using the value of these design variables.

It should be noted that, as for the determination with respect to convergence in step 330, it is assumed that a convergence has been attained if any one of the following conditions is met:

1) The number of generations has reached GM
2) The number of strings in which the value of the objective function is the largest has accounted for q% of the total
3) The maximum value of the objective function is not updated in subsequent p generations.

It should be noted that M, q, and p are inputted in advance by the user.

Tires with the pitch arrangements of the above described first, second and third embodiments were actually manufactured and tested for trial, and the results of the tests are shown in Table 1 below.

TABLE 1

|  | Conventional tire | Embodiment (1) | Embodiment (2) | Embodiment (3) |
| --- | --- | --- | --- | --- |
| time required for design & development | 100 | 60 | 60 | 60 |
| time required for CPU | 100 | 560 | 215 | 970 |
| noise when passing (60 km/h) | — | −0.6 dB(A) | −0.4 dB(A) | −0.6 dB(A) |
| control comparison* noise feeling | 6 | 7.5 | 7.0 | 7.5 |
| noise on table passing (60 km/h) control comparison | — | −2.0 dB(A) | −1.2 dB(A) | −1.7 dB(A) |

*10 points evaluation (feeling evaluation by an actual vehicle running test)
Tire size: 205/60HR15
Internal pressure: 2.0 kg/cm$^2$ The above values of noise when passing, control comparison noise feeling, and noise from table passing control comparison are measures of tire performance.

During trial manufacturing of tires with the pitch arrangement of these embodiments and testing of a noise measurement, the inventor has found that a relation between blocks of the minimum pitch length and blocks of the maximum pitch length have some meanings.

The pitch arrangements can be classified roughly into two types. The regular shape pitch arrangement is regularly arranged to have a good appearance. A random pitch arrangement is arranged without regularity. With respect to a noise reduction effect which reduces noise when running, the random pitch arrangement which is arranged to improve the noise reduction effect provides a better performance.

In the random pitch arrangement, however, because the block having the maximum pitch length sometimes happens to be arranged next to the block having the minimum pitch length, a difference in rigidity resulting in a generation of an irregular wear is easily brought about. Therefore, the noise performance which is excellent at the beginning of use of the tires deteriorates with time.

In order to determine the pitch arrangement which can provide a decreasing of a generation of the irregular wear as well as an improvement of the noise reduction effect achieved by the random pitch arrangement, the blocks adjacent to each other in the circumferential direction of the tire and the relation between the blocks having the maximum pitch length and the blocks having the minimum pitch length should be taken into account.

Figure 17:
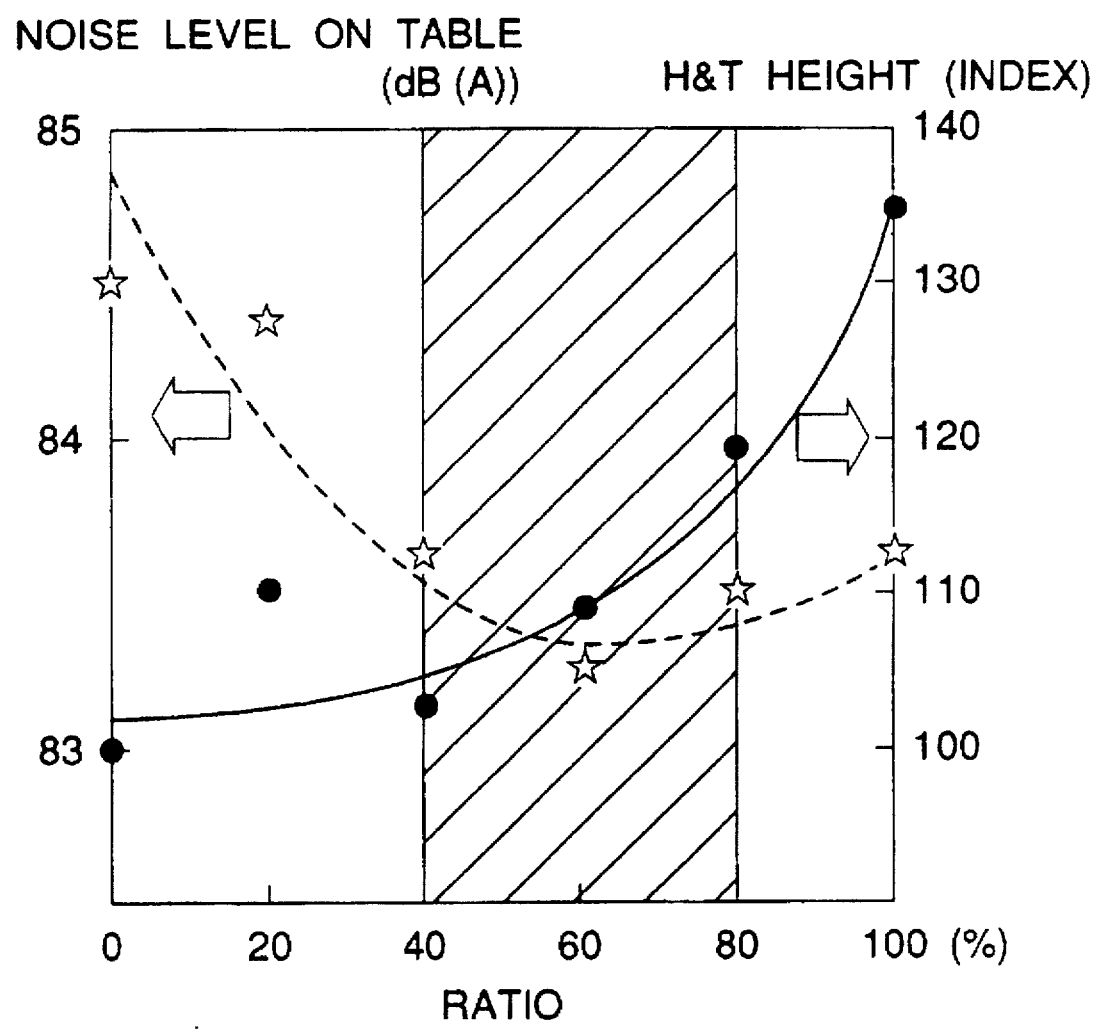
FIG. 17 is a characteristic drawing showing value of noise level, H&T height and ratio of the locations where the pitches change to the whole.

In FIG. 17, an analysis of the noise test results of the trial manufactured tires with pitch arrangements of the aforementioned embodiments are shown. The left ordinate shows a value of the noise level, the right ordinate shows H&T height, and the abscissa shows a ratio of the locations where the pitches change to the whole. The tires used had the following characteristics.

Figure 19:
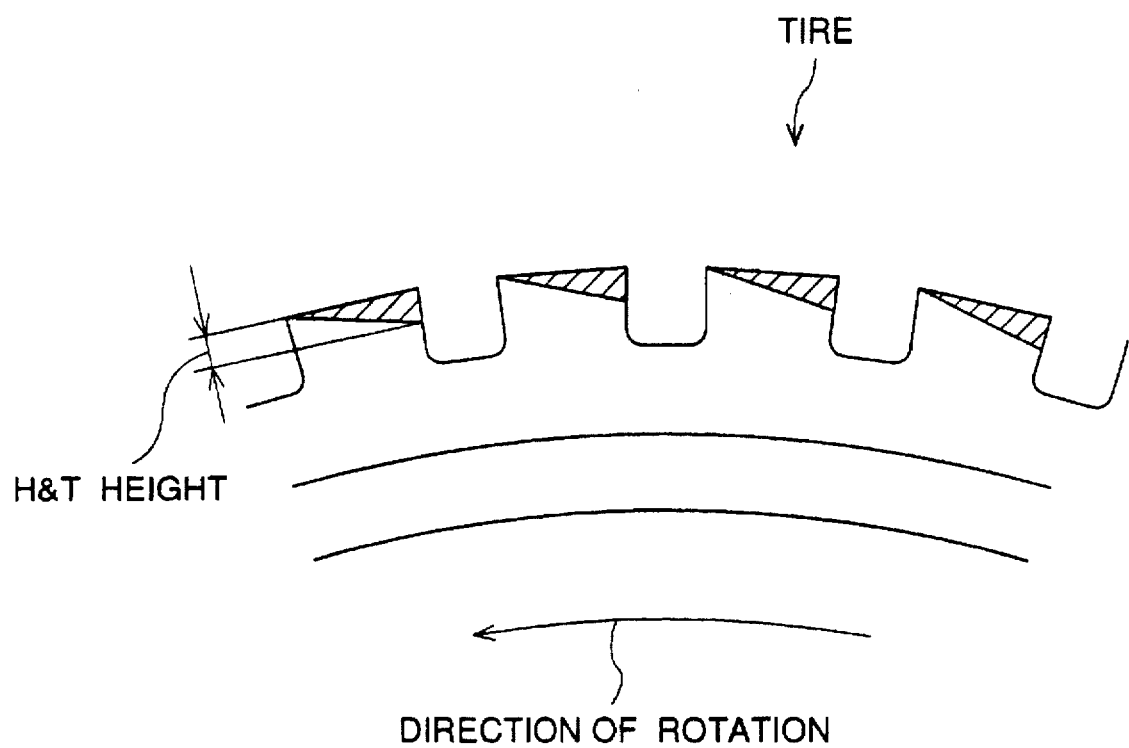
FIG. 19 is a diagram illustrating heel and toe wear.

The number of the pitches: 5
Pitch ratio: 7, 8, 9, 10, 11
The number of the pitches: 60 pcs
Tire size: 205/60HR15
Internal pressure: 2.0 kg/cm$^2$
Caramel type pattern The value of the noise level shows the noise level of the tire when the vehicle runs at a speed of 60 km/h, and the H&T height shows an average value of the H&T height of a plurality of the tires whose pitch arrangements are the same after 5000 km running. The H&T height (heel and toe height) is a phenomenon in which the blocks connected in the circumferential direction of the tire are worn in the form of saw teeth in the circumferential direction. This H&T height is shown in FIG. 19. In this measurement, the tire when produced has 100 points with zero ratio in FIG. 17. The ratio of the locations where the pitches change to the whole is the ratio of $2 \leq D \leq M-2$ ($4 \leq M$; M: the number of the kinds of the pitch length in the pitch arrangement) with respect to the number of the blocks N adjacent each other when an absolute value of a fluctuation value of the pitch lengths of the pitches adjacent each other in the circumferential direction of the tire is one or more. In FIG. 17, the ratio of the locations where the pitches change at the fluctuation value $D(2 \leq D \leq 3)$ when $M=5$ is shown.

As shown in FIG. 17, the ratio of the locations where the pitches change to the whole is within a range of 40% to 80%, and the pitch arrangement which can prevent the irregular wear is obtained. Therefore, as far as the ratio of $2 \leq D \leq M-2$ ($4 \leq M$; M: the number of the kinds of the pitch length in the pitch arrangement) with respect to the number of the blocks N adjacent each other when an absolute value of a fluctuation value of the pitch lengths of the pitches adjacent each other in the circumferential direction of the tire is one or more is within a range of 40% to 80%, the pitch arrangement which is able to prevent the irregular wear can be determined.

That is, D is absolute difference value. The number D is determined on the basis of the formula $2 \leq D \leq M-2 (4 \leq M)$ as numerator; M is the number of the kinds of the pitches. For instance if the number of the kinds of the pitch is 5, then $2 \leq D \leq 3$, that is D is 2 ,3.

The number of a pair of the blocks N adjacent each other having absolute value D which is one or more is the denominator (this means location where the pitch changes). The ratio:

$$= \frac{D: \text{(location where the pitch changes and satisfying above condition); 2,3}}{N: \text{(All locations where the pitch changes); 1,2,3,4 is 40-80\%}}$$

Figure 18:
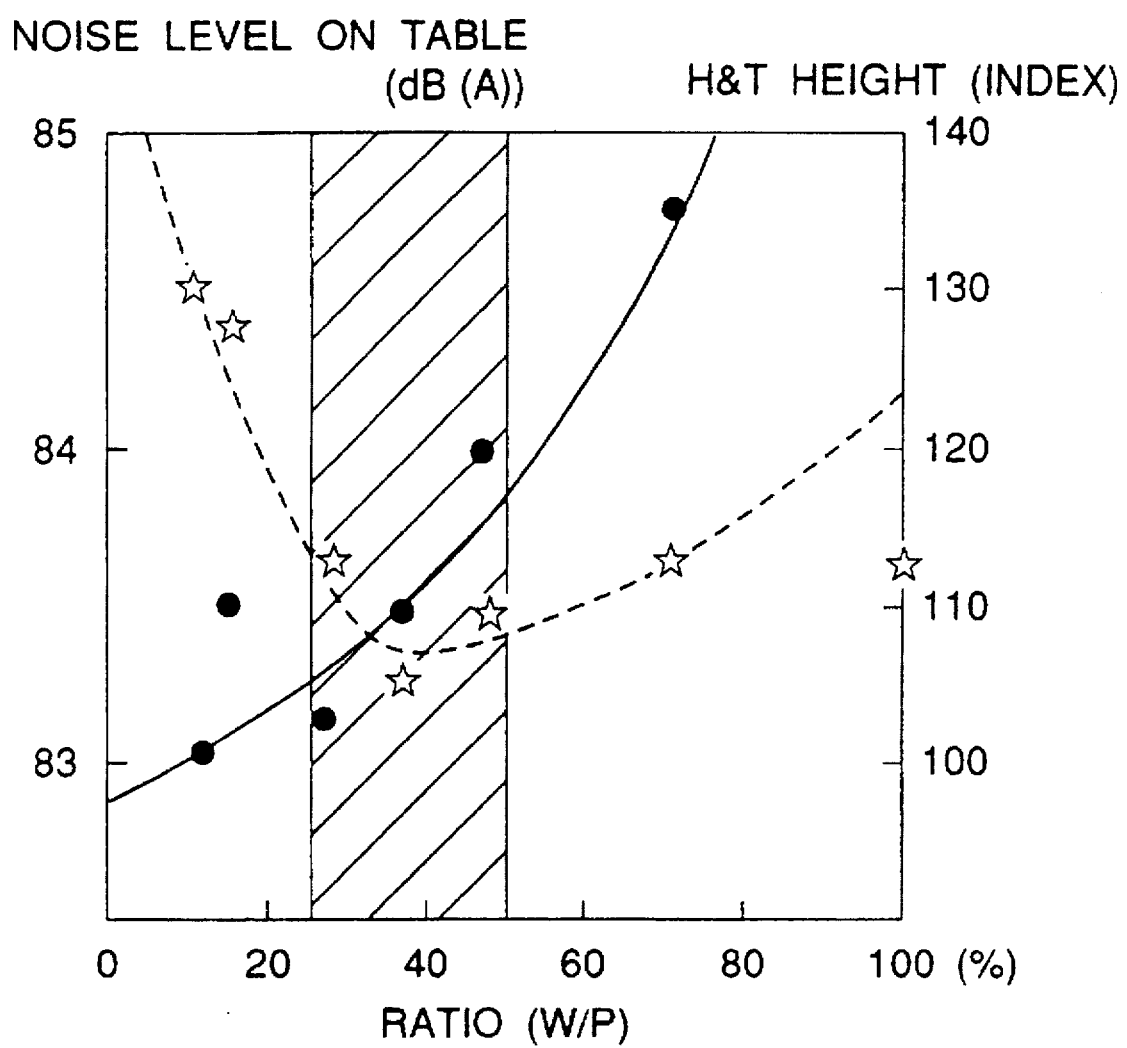
FIG. 18 is a characteristic drawing showing value of noise level, H&T height, and ratio of the total amount of the number of the maximum pitch length and the minimum pitch length to the entire amount of the number of the pitches.

In FIG. 18, analysis of the noise test results of the trial manufactured tires with pitch arrangements of the aforementioned embodiments are shown. The left ordinate shows a value of the noise level, the right ordinate shows H&T height, and the abscissa shows a ratio of the total amount of the number of the maximum pitch length and the minimum pitch length to the whole amount of the number of the pitches. These tires were manufactured under the same conditions as described with reference to FIG. 17. The ratio of the total amount of the number of the maximum pitch length and the minimum pitch length to the whole amount of the number of the pitches is the ratio of W representing the total amount of the blocks having the maximum pitch length and the minimum pitch length to PN representing the number of the pitches arranged in the circumferential direction of the tire (W/PN).

As shown in FIG. 18, when the ratio W/PN is within a range of 25% to 50%, a pitch arrangement which can prevent irregular wear is obtained. Therefore, as far as the ratio of the total amount of the number of the maximum pitch length and the minimum pitch length to the whole amount of the number of the pitches is within a range of 25% to 50%, the pitch arrangement which can prevent the irregular wear is determined under a constraint of the pitch length when the block having the maximum pitch length with a high rigidity and the block having the minimum pitch length with a low rigidity are arranged adjacent each other.

The pitch arrangement which is, taking conditions obtained from FIG. 17 and FIG. 18 into consideration, determined is shown below.

(1) total amount of the pitches - - - 60
(2) pitch identifier - - - pitch length
1 - - - 9
2 - - - 15
3 - - - 14
4 - - - 13
5 - - - 9

| (3) (pitch location) - (pitch identifier) | | | | | |
|---|---|---|---|---|---|
| 1-3 | 11-1 | 21-2 | 31-2 | 41-2 | 51-1 |
| 2-3 | 12-2 | 22-4 | 32-3 | 42-4 | 52-2 |
| 3-5 | 13-3 | 23-3 | 33-5 | 43-3 | 53-4 |
| 4-3 | 14-2 | 24-5 | 34-3 | 44-4 | 54-5 |
| 5-2 | 15-4 | 25-5 | 35-5 | 45-2 | 55-3 |
| 6-1 | 16-2 | 26-4 | 36-4 | 46-1 | 56-2 |
| 7-3 | 17-4 | 27-3 | 37-2 | 47-3 | 57-3 |
| 8-3 | 18-5 | 28-4 | 38-1 | 48-5 | 58-4 |
| 9-2 | 19-5 | 29-2 | 39-1 | 49-3 | 59-2 |
| 10-1 | 20-4 | 30-1 | 40-1 | 50-2 | 60-4 |

Figure 20:
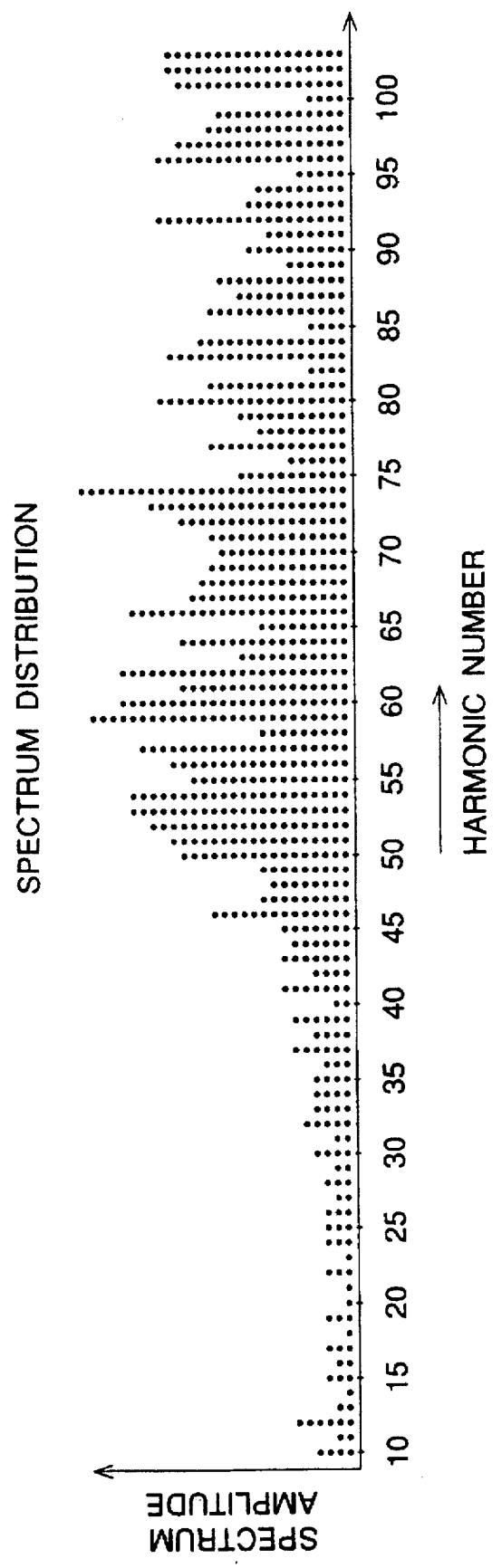
FIG. 20 is a drawing illustrating noise characteristics of an experimental tire.

The tire of this experiment was trial manufactured, and tested. A noise measurement was done for this tire, and the results are shown in FIG. 20. In FIG. 20, the ordinate shows a harmonic number, and the abscissa shows a spectrum amplitude.

TABLE 2

|  | Conventional tire | Experimental tire |
|---|---|---|
| H&T height | 100 | 70 |
| noise feeling | 6 | 7.5 |

The noise feeling is evaluated by 10 points evaluation. The H&T height is shown using an index wherein the conventional tire has a value of 100.

As can be seen from the above explanation, because a pitch arrangement of a tire is designed on the basis of a design variable which gives the optimum value of an objective function while satisfying a constraint, the design of the tire can be achieved in an optimum manner.

According to the method of determining a pitch arrangement of the present invention, which is different from a conventional method of design and development, it is possible to design in an optimum manner with its noise evaluation at the same time to some extent and achieve effective design work and reduced cost of the development.

While the invention has been particularly shown and described with reference to certain preferred embodiments thereof, it will be understood by those skilled in the art that various changes and modifications may be made without departing from the spirit and scope of the invention.

I claim:

1. A method of determining a pitch arrangement of a tire which selects a pitch arrangement having an optimum value of an objective function among a plurality of pitch arrangements after determining a plurality of pitch arrangements corresponding to a plurality of initial arrangements by repeating, in each of predetermined initial arrangements, the steps of:

(a) determining a model of a noise pulse generated in each pitch of the tire;

(b) selecting the objective function representing a physical amount for evaluating noise performance of the tire;

(c) selecting a design variable to determine the pitch arrangement;

(d) selecting a constraint for constraining the pitch arrangement;

(e) determining a value of said design variable which provides an optimum value of the objective function while satisfying the constraint; and (f) designing the pitch arrangement on the basis of the design variable which provides the optimum value of the objective function.

2. The method according to claim 1, wherein step (a) comprises: determining a group subject to selection, consisting of a plurality of pitch arrangements; and determining, with respect to the pitch arrangements of the group subject to the selection, the objective function representing the physical amount for evaluating tire performance, the design variable for determining the pitch arrangements, the constraint for constraining at least one of adjacent pitch length ratios, a maximum pitch length ratio and a minimum pitch length ratio, the numbers of pitches belonging to each pitch length, the number of the pitches having the same pitch length arranged in a row, and the physical amount for evaluating performance, and an fitness function which can be evaluated from the objective function and the constraint; and step (e) comprises: selecting two pitch arrangements from the group subject to selection on the basis of the fitness function; effecting at least one of generating a new pitch arrangement by allowing design variables of the pitch arrangements to cross over each other at a predetermined probability and of generating a new pitch arrangement by changing a portion of the design variable of at least one of the pitch arrangements, determining the objective function, the constraint, and the fitness function of the pitch arrangement with the design variable changed; preserving said pitch arrangement and the pitch arrangement with the design variable not changed, an aforementioned process of step (e) being repeated until the pitch arrangement preserved reaches a predetermined number; determining whether or not a new group consisting of the predetermined number of the preserved pitch arrangement satisfies a predetermined convergence criterion; and if the convergence criterion is not satisfied, repeating a foregoing process of step (e) until the group subject to selection satisfies a predetermined convergence criterion by setting the new group as the group subject to selection; and if the predetermined convergence criterion is satisfied, determining the value of the design variable which gives the optimum value of the objective function among the predetermined number of the preserved pitch arrangement while taking the constraint into consideration.

3. The method according to claim 2, wherein in step (e), with respect to the pitch arrangement with the design variable changed, the amount of change of the design variable which gives the optimum value of the objective function is estimated while taking the constraint into consideration on the basis of the sensitivity of the objective function, which is the ratio of the amount of change of the objective function to the of unit change to the design variable, and on the basis of the sensitivity of the constraint, which is the ratio of the amount of change of the constraint to the amount of unit change of the design variable, the value of the objective function when the design variable is changed by the amount corresponding to the estimated amount and the value of the constraint when the design variable is changed by the amount corresponding to the estimated amount are calculated, the fitness function is determined from the value of the objective function and the value of the constraint, said pitch arrangement and the pitch arrangement with the design variable not changed are reserved, and an aforementioned process of step (e) is repeated until the preserved pitch arrangement reaches the predetermined number.

4. The method according to claim 1, wherein step (b) comprises:

estimating an amount of change of the design variable which gives the optimum value of the objective function while taking the constraint into consideration on the basis of a sensitivity of the objective function, which is a ratio of an amount of change of the objective function to an amount of unit change of the design variable, and a sensitivity of the constraint, which is a ratio of an amount of change of the constraint to an amount of unit change of the design variable; calculating a value of the objective function when the design variable is changed by an amount corresponding to the estimated amount and a value of the constraint when the design variable is changed by the amount corresponding to the estimated amount; and determining the value of the objective function on the basis of the estimated value and the calculated values while taking the constraint into consideration.

5. The method according to claim 1, wherein the design variable is a function representing the pitch arrangement.

6. The method according to claim 1, wherein, if a function is set as the design variable, in order to keep a pitch length within a predetermined range when the design variable is varied in step (e), the constraint is determined, and the value of the design variable while taking the constraint into consideration is determined by executing step (e).

7. The method according to claim 1, wherein, in the initial arrangement, the pitches are arranged so as to change its length step wise in order and the number of the pitch belonging to each step is predetermined, in step (a), a model of the noise pulse generated in each pitch and the objective function representing the physical amount for evaluating noise performance are determined, in step (e), the numbers of the pitches belonging to the steps between different steps are changed, and the pitch arrangement is determined by executing step (f) on the basis of the number of the pitches in each step which gives the optimum value of the objective function.

8. The method according to claim 1, wherein, in the pitch arrangement, as for M blocks having a certain pitch length when the blocks are arranged in order of the pitch length from the block having the maximum pitch length to the block having the minimum pitch length, an identifier i which shows a value representing the order from the identifier 1 showing the block of the minimum pitch length to the identifier M showing the block of the maximum pitch length M in order is arranged so as to increase its value in order, when an absolute value of the difference of the identifier of the adjacent blocks in a circumferential direction of the tire is D and the number of a pair of adjacent blocks having D greater than 1 is N, a ratio of D (the locations where the pitch changes) to N (all locations where the pitch changes) is 40% to 80%, where $2 \leq D \leq M-2$ ($4 \leq M$).

9. The method according to claim 1, wherein, in the pitch arrangement, when the number of the pitch arranged in the circumferential direction of the tire is P, a total of blocks having a maximum pitch length and blocks having a minimum pitch length is W, a ratio of W to P is 25%–50%.

10. A method according to claim 1, wherein step (b), the objective function is selected from the group of: a physical amount for evaluating noise performance of the tire, an amplitude value to a harmonic number working as a function of cycle/rotation of the tire, a square value of amplitude, and a deviation of an amplitude at each harmonic number.

11. A method according to claim 1, wherein step (c), the design variable is selected from the group of: the pitch arrangement, and the pitch length.

12. A method according to claim 1, wherein step (d), the constraint is selected from the group of: adjacent pitch length ratio, a maximum pitch length and minimum pitch ratio, and the number of pitches belonging to each pitch length, the number of the pitches having the same pitch length arranged in a row, and the physical amount for evaluating performance, which is not as same as the objective function.

13. A method of determining a pitch arrangement of a tire which selects a pitch arrangement having an optimum value of an objective function among a plurality of pitch arrangements after determining a plurality of pitch arrangements corresponding to a plurality of initial arrangements by repeating, in each of predetermined initial arrangements, the steps of:

(a) determining a model of a noise pulse generated in each pitch of the tire;

(b) selecting the objective function representing a physical amount for evaluating noise performance of the tire;

(c) selecting a design variable to determine the pitch arrangement;

(d) selecting a constraint for constraining the pitch arrangement;

(e) varying a value of said design variable while satisfying the constraint until an optimum value of the objective function is obtained; and (f) designing the pitch arrangement on the basis of the design variable which provides the optimum value of the objective function.

14. A method according to claim 13, wherein step (b), the objective function is selected from the group of: a physical amount for evaluating noise performance of the tire, an amplitude value to a harmonic number working as a function of cycle/rotation of the tire, a square value of amplitude, and a deviation of an amplitude at each harmonic number.

15. A method according to claim 13, wherein step (c), the design variable is selected from the group of:

the pitch arrangement, and the pitch length.

16. A method according to claim 13, wherein step (d), the constraint is selected from the group of: adjacent pitch length ratio, a maximum pitch length and minimum pitch ratio, and the number of pitches belonging to each pitch length, the number of the pitches having the same pitch length arranged in a row, and the physical amount for evaluating performance, which is not as same as the objective function.

* * * * *